United States Patent [19]
Takayasu

[11] Patent Number: 5,874,178
[45] Date of Patent: Feb. 23, 1999

[54] CLADDING MATERIAL

[75] Inventor: Akira Takayasu, Aichi-ken, Japan

[73] Assignee: Showa Entetsu Co., Ltd., Aichi-ken, Japan

[21] Appl. No.: 658,122

[22] Filed: Jun. 4, 1996

[30]    Foreign Application Priority Data

| Jul. 6, 1995 | [JP] | Japan | 7-194223 |
| Jul. 6, 1995 | [JP] | Japan | 7-194224 |
| Jul. 6, 1995 | [JP] | Japan | 7-194225 |

[51] Int. Cl.$^6$ .............................. B32B 15/01; B32B 15/18
[52] U.S. Cl. .......................... 428/681; 428/662; 428/668; 428/675; 428/676; 428/680; 428/682; 428/685; 228/175; 228/190
[58] Field of Search .................................... 428/670, 681, 428/685, 675, 662, 655, 660, 668, 680, 682; 228/262.3, 262.4, 262.41, 262.44, 262.7, 175, 190

[56]    References Cited

U.S. PATENT DOCUMENTS

| 2,814,717 | 11/1957 | Hardesty . | |
| 2,814,718 | 11/1957 | Hardesty . | |
| 3,598,550 | 8/1971 | Takahashi | 29/199 |
| 3,764,277 | 10/1973 | Hollis . | |
| 4,393,122 | 7/1983 | Takayasu . | |
| 4,524,989 | 6/1985 | Centeny | 280/281 |
| 4,568,484 | 2/1986 | Takayasu | 252/512 |
| 4,627,960 | 12/1986 | Nakajima et al. | 420/472 |
| 5,305,946 | 4/1994 | Heilmann | 228/184 |

FOREIGN PATENT DOCUMENTS

| 0 060 083 B1 | 5/1985 | European Pat. Off. . |
| 42 19 619 C 1 | 6/1992 | Germany . |
| 60-135248-A | 7/1985 | Japan . |
| WO80/02246 | 10/1980 | WIPO . |

OTHER PUBLICATIONS

I.B. Wingate and J.F. Mohler, "Textile Fabrics and their Selection," 8th ed., pp. 23 and 25, 1984.

Primary Examiner—Marion E. McCamish
Assistant Examiner—Cheryl Juska
Attorney, Agent, or Firm—Ronald R. Snider

[57]    ABSTRACT

The cladding material 10 comprises an Fe-based metal substrate 1 consisting of Fe or an Fe-alloy, a Ni-based metal layer 2 placed on the Fe-based metal substrate 1 and a metal mesh 3 placed on the Ni-based metal layer 2 in opposition to the Fe-based metal substrate 1 with the Ni-based metal layer 2 inbetween. Furthermore, a corrosion resistant metal lining 4 is placed in contact with the metal mesh 3 in opposition to the Ni-based metal layer 2 with the metal mesh 3 inbetween. The Fe-based metal substrate 1, the Ni-based metal layer 2, the metal mesh 3 and the metal lining 4 are bonded together by seam welded portion 8, which is provided in a planer or a linear form by using roller electrodes 6. The metal lining 4 consists of a metal whose main component is the one selected from Ti, Zr, Nb, Ta and Ni, or consisting of a stainless steel.

20 Claims, 23 Drawing Sheets

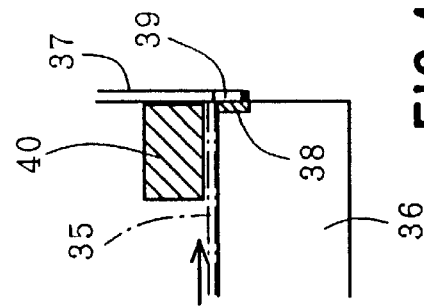
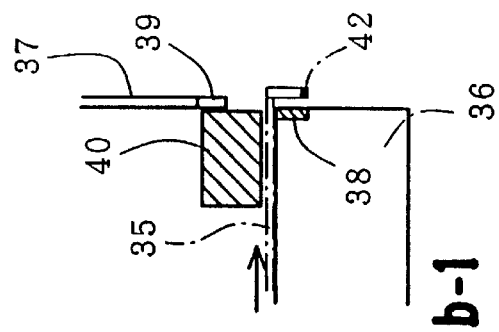
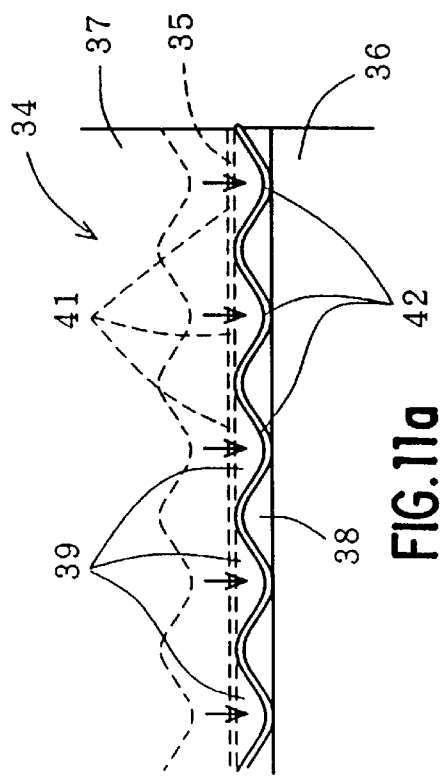
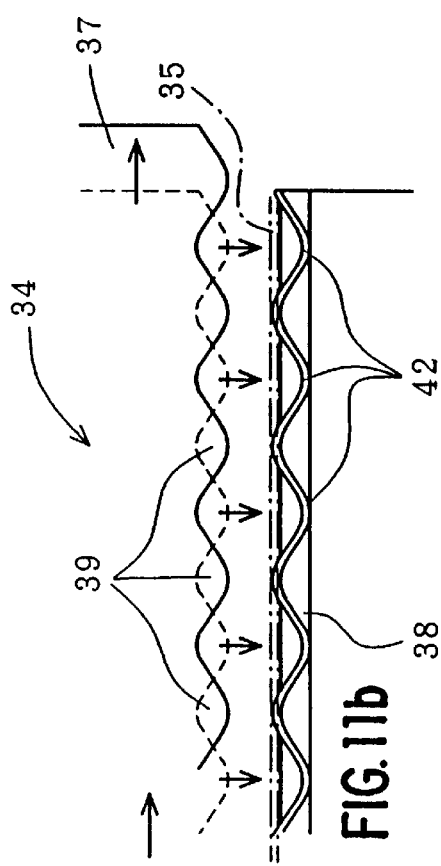

CLADDING MATERIAL

FIELD OF INVENTION

This invention relates to a cladding material wherein a corrosion resistant metal lining is seam-welded on an Fe-based or a Cu-based metal substrate.

BACKGROUND OF INVENTION

As a method for bonding a corrosion resistant metal lining (such as Ti (titanium) or Zr (zirconium)) to an Fe (iron)-based or a Cu (copper)-based metal substrate, various methods, such as explosion bonding, rolling process and spot welding, has been proposed or performed. In the explosion bonding process, a corrosion resistant metal plate and a metal substrate are overlapped and bonded by a charge of explosive powder placed thereon. In the rolling process, a corrosion resistant metal plate and a metal substrate are overlapped and roll-bonded together between a pair of rolls.

However, following problem may occur in the conventional method described above.

(1) In explosion bonding, the sites for performing the process may be limited because of the noise accompanying the explosion detonation. In addition, the production costs are relatively high, and the shape and/or dimension of the cladding material is limited. Furthermore, numerous production steps are necessary for producing a thin plate-like cladding material, because only a thick material is directly produced by means of explosive bonding, and consequently a rolling operation is necessary to obtain a thin one.

(2) The rolling process typically requires an expensive rolling facility and cannot cover irregular shapes or curvature of the substrate. Therefore the only possible shape is only a flat plate. The bonding force between the substrate and the lining typically tends to be weaker than that achieved by the explosion bonding process, so that in many cases an additional diffusion heat treatment is needed for securing the bonding strength. This may lead to an increase in the steps and cost of the process.

(3) The spot welding process is time-consuming since many spot-welded portion should be formed to bond the substrate and the lining. Furthermore, each welded portion is formed in a spot-like shape, so that the bonding force at the welded portion is relatively weak, and a strong sealing is not achieved between the substrate and the lining.

The object of this invention is to offer a cladding material which is produced easily by using seam welding process and has an excellent bonding strength.

SUMMARY OF THE INVENTION

For solving the object mentioned above, the cladding material according to claim 1 has the following constitution. The cladding material comprises an Fe-based metal substrate consisting of Fe (iron) or an Fe-alloy, a Ni (nickel)-based metal layer placed on the Fe-based metal substrate, and a metal mesh placed on the Ni-based metal layer in opposition to the Fe-based metal substrate with the Ni-based metal layer inbetween. Furthermore, a corrosion resistant metal lining (it will be called as "metal lining" or "lining", herein after) is placed in contact with the metal mesh in opposition to the Ni-based metal layer with the metal mesh inbetween. The Fe-based metal substrate, the Ni-based metal layer, the metal mesh and the metal lining are bonded together by seam welded portion, which is provided in a planer or a linear form by using roller electrodes. The metal lining consists of a metal whose main component is the one selected from Ti (titanium), Zr (zirconium), Nb (niobium), Ta (tantalum) and Ni, or consists of a stainless steel. The Fe-based metal substrate may consist of, for example, a carbon steel, stainless steel or other alloy steel.

The cladding material described above may be produced according to the following process. A Ni-based metal layer, a metal mesh and a corrosion resistant metal lining are laminated on the metal substrate in this order. Roller electrodes are urged to the laminate with a designated pressure and send electric current thereto for resistance heating. Then, the roller electrodes are relatively rolled on the laminate for forming seam welded zone. The electric current may be sent into the laminate by using a plurality of roller electrodes which pinch the laminate therebetween. On the other hand, a method without pinching the laminate between the roller electrodes, such as series seam welding, is also available. In the series seam welding process, a roller electrode is arranged on the metal lining, and the other electrode is arranged on the same side. Electric current is sent into the laminate along a path starting from one electrode, passing through the laminate across the thickness thereof, turning sideward along the laminating plane, then reaching to the other electrode with passing through the laminate again in the opposite direction. As the electric current, both alternating current and direct current are available for this invention.

The metal mesh has a small cross section for the current path because of a number of opening formed therein. Furthermore, the contacting area with Ni-based metal layer or with the metal lining is also small, so that the temperature raises around the metal mesh due to the large resistance heat generated therefrom. Thus, the heated metal mesh is to be intruded into at least one of the metal lining and the Ni-based metal layer, which are softened due the resistance heating, under a pressure from the roller electrodes. The bonding force appears to be increased according to such intrusion effect of the metal mesh, or a large bonding area of the metal mesh due to the irregularity thereof, and so on.

The Ni-based metal layer appears to have at least one of following functions:

(1) The Ni-based metal layer generates a liquid phase by its own melting or by melting along with a part of metal mesh due to the resistance heating. The generated liquid phase is supplied to the contacting part between the metal mesh and the metal substrate. Ni or a Ni-alloy has an excellent wettability for an Fe-based material constituting the metal substrate, so that the liquid phase generated may function as a brazing material which increases the bonding force between the metal mesh and the metal substrate. Furthermore, since the liquid phase is supplied to the mesh opening, the Ni-based metal layer may function as a brazing material for bonding the metal lining and the metal mesh together.

(2) Even in the case that no liquid phase is generated, a part of the component of the Ni-based metal layer may diffuse into the metal mesh and the metal substrate, (or into the metal lining through the mesh opening), thereby increasing the bonding force.

A Ni-alloy containing at least one of Cr (chromium), B (boron), Si (silicon), C (carbon), P (phosphorus), Mo (molybdenum), W (tungsten) and Fe, particularly, an alloy containing Ni as a main component, 5–16 wt % of Cr, 2–4 wt % of B, 3.5–5.5 wt % of Si and 2–5 wt % of Fe, is preferably used for the Ni-based metal layer since the alloy exhibits excellent flowability and wettability under resistance heating.

According to the above mentioned functions of the metal mesh and the Ni-based metal layer, the cladding material is to have a strong bonding force between the metal lining and the metal substrate. Due to particularly a brazing and soldering effect or a diffused junction effect of the Ni-based metal layer, the welding force (i.e., pressure from the roller electrodes) and current during the seam welding may be reduced in comparison with that for a case using no Ni-based metal layer, so that a good bonding state is achieved by a relatively small welding force and welding current, even for a metal substrate and/or a metal lining having a considerable large thickness.

By using a metal mesh consisting of a material harder than the metal lining around the welding temperature, the bonding strength may improve since the intrusion effect of the metal mesh against the metal lining is enhanced. The bonding force may be increased also by adjusting the generation of the resistance heat so that the metal lining is softened moderately by the heat generation from the metal mesh itself or from the contacting part thereof, since the intrusion of the metal mesh into the metal lining is promoted significantly. Furthermore, the bonding strength may improve by choosing materials having an excellent affinity with each other for the metal mesh and the metal lining, respectively. In this case the meaning of "having an excellent affinity with each other" is that each material has a good interdiffusivity around the welding temperature, or has an excellent wettability against the liquid phase generated by their own partial melting.

More specifically, the metal mesh may be dominantly constituted of an Fe-based metal, and the metal lining may consist of a metal containing Ti or Zr for a main component. In this case, the resulting cladding material is superior both in the junction effect due to the interdiffusion of components between these two layers and in the intrusion effect therebetween. As the Fe-based material for the metal mesh, a stainless steel (for example, SUS304 defined in the Japanese Industrial Standard) is preferably used since a stainless steel is resistive against rust formation on the surface, and has a relatively high specific resistivity which is preferable for resistance heating.

Besides an Fe-based material, a Cu-based or a Ni-based material may be used for the metal mesh. Such metal mesh is preferably used for a metal lining consisting of a metal whose main component is the one selected from Nb, Ta and Ni, or consisting of a stainless steel. The liquid phase generated by partial melting of the metal mesh consisting of such material exhibits an excellent wettability for the metal lining consisting of the materials mentioned above, so that a good bonding state may be achieved due to a kind of a brazing and soldering effect.

The Ni-based metal layer may comprise a Ni-based metal foil (claim 2). A metal foil has a high heat conductivity and functions as a radiator for the heat generated in the seam welded zone, thereby prohibiting or controlling the oxidation of the inner surface of the metal lining to be seam welded. The Ni-based metal layer can be formed as a layer plated on the surface of the metal substrate. The plated layer may be formed by various methods, such as electroplating, electroless plating, vacuum evaporation, sputtering. Furthermore, the Ni-based metal layer can be constituted as a powder layer of Ni-based metal. The powder layer can be formed by, for example, applying a paste-like mixture of a metal powder and a flux on the surface of the metal substrate. The Ni-based metal layer may be formed also by a thermal spraying of a metal powder.

The metal mesh can be formed as the one the opening of which is formed by making staggered cuts in a metal plate over the whole part thereof so that each cut passes through the thickness of the metal mesh, and expanding the metal plate in a direction intersecting the length of the cuts thereby opening each cut (claim 3: in this specification, such mesh will be called as "expanded metal", hereafter). The expanded metal may consist of a metal whose main component is the one selected from Fe, Ni and Cu. Such expanded metal is easy to manufacture and may contribute to a cost reduction of manufacturing the cladding material. The expanded metal may be prepared more specifically by a method that the portions on both sides of each cut of the metal plate is deformed along the thickness thereof in opposite direction each other for opening each cut. A rolling may be performed against the expanded metal obtained.

The metal mesh may comprise a plurality of elemental meshes laminated each other. The plurality of elemental meshes may consist either of single material or of more than two materials.

In the cladding material described above, the metal lining and the metal substrate are bonded by using both the metal mesh and the Ni-based metal layer. However, in a case that a sufficient bonding strength is achieved only by using a metal mesh, the cladding material may be constituted as the one without comprising the Ni-based metal layer. A specific constitution thereof comprises an Fe-based metal substrate consisting of Fe or Fe-alloy, a metal mesh consisting of a metal containing Fe as a main component and placed on the Fe-based metal substrate, and a corrosion resistant metal lining placed in contact with the metal mesh in opposition to the Fe-based metal substrate with the metal mesh inbetween. The Fe-based metal substrate, the metal mesh and the corrosion resistant metal lining are bonded together by a seam welded zone which is provided in a planer or linear form by using roller electrodes (claims 4–6). In this case, the metal lining consists of a metal whose main component is the one selected from Ti, Zr, Nb, Ta and Ni, or consists of a stainless steel. Whereby the bonding strength between the metal lining and the metal substrate may become very strong. The metal substrate may consist of, for example, a carbon steel, stainless steel or other alloy steel.

In one of other specific constitution, a part of the metal mesh consists of Fe or an Fe-alloy, or at least a part of the metal mesh consists of a metal whose main component is Ni or Cu, and the metal lining consists of a metal whose main component is the one selected from Ti, Zr, Nb, Ta and Ni, or consists of a stainless steel (claim 7). The metal mesh may consist of a Cu-alloy containing one or more selected from Zn, Sn, Ni and P (claim 8). More specifically, the metal mesh may consist of a Cu-alloy containing 1–20 wt % of Sn, and furthermore specifically, may consist of a Cu-alloy containing less than 0.5 wt % of P besides Sn in the range mentioned above.

One example of the metal meshes a part of which consist of Fe or an Fe-alloy can be constituted as a multilayered mesh comprising one or more elemental meshes consisting of Fe or an Fe-alloy and other one or more elemental mesh consisting of a material containing a main component except for Fe. Such multilayered mesh can be formed in a two-layered mesh comprising an Fe-based elemental mesh located on the side of the metal lining and a Ni-based or a Cu-based elemental mesh located on the side of the metal substrate. The multilayered mesh can be formed also in a three layered mesh wherein a Ni-based or a Cu-based elemental mesh is inserted between two Fe-based elemental meshes.

The cladding material according to claim 9 offers one more other constitution without comprising the Ni-based metal layer. In this cladding material, the metal lining consists of a metal whose main component is the one selected from Ti, Zr, Nb, Ta and Ni, or consists of a stainless steel. In this constitution, the metal mesh is formed as the aforementioned expanded metal whole of which consists of a metal with a main component selected from Fe, Ni and Cu. The cost of manufacturing the cladding material may be reduced by using such expanded metal.

The cladding material according to claim 10 is constituted as follows. A metal mesh is placed on a metal substrate consisting of the one selected from Fe, Fe-alloy, Cu and Cu-alloy. The metal mesh is formed by knitting or wearing two sets of metal wires consisting of materials different from each other (see FIGS. 8 and 20). A corrosion resistant metal lining is placed in contact with the metal mesh in opposition to the Fe-based metal substrate with the metal mesh inbetween. The metal substrate, the metal mesh and the metal lining are bonded together by seam welded zone which is provided in a planer or linear form by using a roller electrode.

By using the mesh comprising two sets of metal wires, following effect is to be achieved.

(1) The total electric resistivity of the metal mesh may be easily adjusted according to a consideration for a proper combination of materials of the metal meshes having different values of resistivity. In a case of using a mesh consisting of a single material, the electric resistivity thereof is sometimes too high, and the heat generation from the mesh becomes excess. This may cause melting down of the metal mesh or too much softening of the metal lining or the metal substrate. In the latter case, the whole part of the metal mesh may be buried into the lining, and the bonding force between the metal lining and the metal substrate decreases since the intrusion of the metal mesh becomes insufficient. Such problem can be evaded by adjusting the total electric resistivity of the metal mesh using plural sets of wires, whereby excellent bonding state is to be achieved.

(2) In a case of, for example, using two sets of metal wires, a high bonding strength between the metal lining and the metal substrate can be achieved by using a mesh wherein one of the sets of wires is constituted of a material having a high affinity or an intrusion effect for the metal lining while the other is constituted of a material having a high affinity or an intrusion effect for the metal substrate.

In the constitution described above, an intermediate metal layer may be inserted between the metal substrate and the metal mesh (claim 11). The material of the intermediate metal layer can be selected according to the material of the metal substrate and/or that of the metal mesh. For the metal substrate consisting of Fe or an Fe-alloy (Fe-based metal substrate, hereinafter), a Ni-based or a Cu-based metal layer is preferably used as said intermediate metal layer. The form and the function of these metal layers are almost the same as the Ni-based metal layer that for the cladding material according to claim 1, so that further description is omitted. On the other hand, the intermediate metal layer suitable for a Cu-based metal substrate will be explained later on.

In the cladding material according to claim 10, the corrosion resistant metal lining may consist of a metal whose main component is the one selected from Ti, Zr, Nb, Ta and Ni, or consist of a stainless steel (claim 13). Furthermore, the metal mesh may be constituted as the one comprising the first metal wires which extend along a designated direction and are arranged almost parallel to each other, and the second metal wires which extend along a direction intersecting with the designated direction and are arranged almost parallel to each other, consisting of a material different from the first wires (claim 12).

When the metal substrate is an Fe-based one (i.e., consisting of Fe or an Fe-alloy) in the cladding material according to claim 12, the metal mesh can be constituted as the one wherein at least one of the first metal wires and the second metal wires consists of a metal whose main component is the one selected from Fe, Ni and Cu (claim 14). More specifically, the first metal wires may consist of a stainless steel while the second ones may consist of a material having an electrical resistivity lower than that of the first ones, such as a metal having main component selected from Fe, Ni and Cu. In one of the examples of this constitution, the second metal wires consists of a carbon steel. A coating of a corrosion resistive material, such as Zn, may be applied on the surface of the carbon steel wires.

When the metal substrate consists of Cu or Cu-alloy, the cladding material according to claim 12 may be constituted as follows. An intermediate metal layer which consists of a metal having a melting point lower than that of the Cu-based metal substrate. A metal mesh is placed on the Fe-based metal substrate in opposition to the Cu-based metal substrate with the intermediate metal layer inbetween. The metal mesh comprises the first metal wires and second wires. The first ones extend along a designated direction and are arranged almost parallel to each other. The second ones extend along a direction intersecting with said designated direction and are arranged almost parallel to each other. Furthermore, the second wires consist of a material different from the first wires, and at least one of the first and second ones consists of a metal whose main component is the one selected from Fe, Ni and Cu. A corrosion resistant metal lining is placed contacting with such metal mesh in opposition to the Fe-based metal substrate with the metal mesh inbetween. The Fe-based metal substrate, the intermediate metal layer, the metal mesh and the corrosion resistant metal lining are bonded together by seam welded zone which is provided in a planer or linear form by using a roller electrode (claim 15).

In the constitution using a Cu-based metal substrate, the metal mesh is preferably formed by using following two sets of metal wires, i.e., wires consisting of a material having high affinity or intrusion effect for the metal lining and wires consisting of a material having a high affinity or an intrusion effect for the metal substrate. A high bonding strength is achieved between the metal lining and the metal substrate according to this constitution. As the material having a high affinity for the metal substrate, a material exhibiting high wettability for the liquid phase due to the melting of the intermediate metal layer is particularly preferable. Furthermore, the intermediate metal layer is preferably constituted of a material having an excellent wettability both for the Cu-based metal substrate and the metal mesh.

By using such materials for the layers and the metal mesh described above, following advantages may be expected. The metal mesh has a small cross section for the current path, so that the resistance heat generation becomes large around the metal mesh. The metal mesh is to be intruded at least into the metal lining under a pressure from the roller electrodes while at least a part of the intermediate metal layer is fused thereby generating a liquid phase. This liquid phase functions as a brazing material for soldering the metal mesh and the metal substrate thereby increasing the bonding force between the substrate and the lining. The liquid phase may be supplied to the contacting part between the metal mesh and the metal lining through the mesh opening, whereby improving the bonding strength.

In the constitution using a Cu-based metal substrate, the intermediate metal layer preferably consists of a material the melting point of which is lower than 1000° C., more preferably lower than 950° C. for securing a sufficient amount of liquid phase during the seam welding. On the other hand, if the melting point is lower than 70° C., only a small increase in the environmental temperature may cause excess softening of the intermediate metal layer which may lead to a drastic decrease in the bonding strength between the metal substrate and the metal mesh. Therefore, the melting point of the intermediate metal layer should be higher than 70° C., preferably higher than 100° C.

The intermediate metal layer can be constituted of a material containing more than 50 wt % of at least one of components selected from Pb (lead), Sn (tin) and Zn (zinc) in total (claim 16). Pb-Sn based alloys (soft solders, for example) are particularly preferable. By using such alloys for the intermediate metal layer, the brazing and soldering effect is enhanced between the metal mesh and the Cu-based metal substrate, whereby the bonding strength of the cladding material increases. Following methods may be preferably used for forming such intermediate metal layer on the Cu-based metal substrate; using a foil of metal or alloy, hot dipping method, applying a paste-like mixture of alloy powder and flux. For adjusting the melting point or the strength of the intermediate metal layer, it is preferable to add at least one component selected from In (indium), Ga (gallium), Zn, Ag and Cu to the alloy.

Besides the alloys described above, following alloys may be preferably used for the intermediate metal layer; an alloy containing Ag and Cu more than 50 wt % in total; an alloy containing more than 70 wt % of Cu and more than 3 wt % of P.

In the case of using a Cu-based metal substrate and a metal lining consisting of a metal whose main component is Ti or Zr, one set of wires is preferably constituted of a stainless steel, and the other set is preferably constituted of a material containing Cu as a main component. According to this constitution, the bonding strength of the cladding material improves since the intrusion effect of the stainless steel wires is enhanced because of the moderate softening of the metal lining due to the resistance heat from the metal mesh.

On the other hand, in a case of using a Cu-based metal substrate and a metal lining consisting of a metal whose main component is selected from Nb, Ta and Ni, one set of wires of the metal mesh is preferably constituted of a material whose main component is Ni, and the other set is preferably constituted of a material whose main component is Cu. According to this constitution, the Ni-based wires are partially fused and generates a liquid phase. According to the soldering effect of this liquid phase, the bonding force between the metal lining and the metal mesh increases.

The cladding material relating to claims 17–20 comprises no metal mesh. In case of using particular materials of the metal lining, the bonding strength at the seam welding zone may be high by using only a Cu-based or Ni-based metal layer, even if the cladding material comprises no metal mesh. The cladding material according to claim 17 comprises an Fe-based metal substrate consisting of Fe or an Fe-alloy, an intermediate metal layer placed on the Fe-based metal substrate, and a metal lining placed on the intermediate metal layer in opposition to the Fe-based metal substrate with the intermediate metal layer inbetween. The intermediate metal layer consists of the one selected from Cu, Cu-alloy, Ni and Ni-alloy, and the metal lining consists of a metal whose main component is the one selected from Nb, Ta, Ni, Zr, or consists of a stainless steel. The Fe-based metal substrate, the intermediate metal layer and the corrosion resistant metal lining are bonded together by seam welded zone which is provided in a planer or a linear form by using roller electrodes. As well as the Ni-based metal layer for the cladding material of claim 1, the Cu-based or Ni-based metal layer may be constituted as a metal foil, a layer plated on the metal substrate, a powder layer or a thermal sprayed layer.

In the constitution described above, an excellent bonding strength may be achieved by using a Ni-based material or a stainless steel for the metal lining. The metal lining can be, for example, constituted of a material containing Ni as a main component, 13–35 wt % of Cr, 3–25 wt % of Fe and 3–35 wt % of Mo (Hastelloy (registered trade mark), for example; claim 18), or a material containing Ni as a main component, 13–30 wt % of Cr and 3–35 wt % of Fe (Inconel (registered trade mark), for example), whereby the cladding material becomes to have a high chemical corrosion resistance and a high temperature corrosion resistance.

In the case of using a Ni-based metal layer, the layer may be constituted of a Ni alloy containing at least of Cr, B, Si, C, P, Mo, W, Fe, particularly constituted of an alloy containing Ni as a main component, 5–16 wt % of Cr, 2–4 wt % of B, 3.5–5.5 wt % of Si and 2–5 wt % of Fe. The Ni-based metal layer consisting of such alloy is fused during the seam welding and generates a liquid phase with high flow ability and wettability, so that a cladding material with a high bonding strength can be obtained.

In the case of using a Cu-based metal layer, the layer may be constituted of a Cu alloy containing at least one of Zn, Sn, Ni and P, whereby the bonding strength of the cladding material may be enhanced. More specifically, the Cu-based metal layer may consist of such alloy as:

a Cu alloy containing 20–50 wt % of Zn, such as brass, and so on;

a Cu alloy containing 3–30 wt % of Zn and 5–40 wt % of Ni (wherein the total content of Zn and Ni does not exceed 50 wt %), such as German silver and so on.

The cladding materials comprising an Fe-based metal substrate are preferably used for following apparatus or structures:

internal lining for distillation columns, reactors, reacting columns, chemical reservoirs, agitation vessels, high pressure gas towers, vessels, separators, tank trucks and so on;

internal lining for heat exchangers (particularly, the lining for a tube sheet thereof);

internal lining for vacuum evaporators.

The cladding materials comprising an Fe-based metal substrate are preferably used for electrodes or bus bars for electroplating or other electrolytic treatments.

Regarding the all constitutions of the cladding materials described above, the metal lining may be bonded to not only one side of the metal substrate but also the other side thereof in the same mode as described above. In this case, the metal lining on each side of the metal substrate can be constituted of different material or in a different mode of structure.

BRIEF DESCRIPTION OF THE DRAWINGS

FIGS. 11a–11d, are schematic views showing the manufacturing process of an expanded metal;

DETAILED DESCRIPTION OF THE PREFERABLE EMBODIMENTS

Figures 1, 11C:
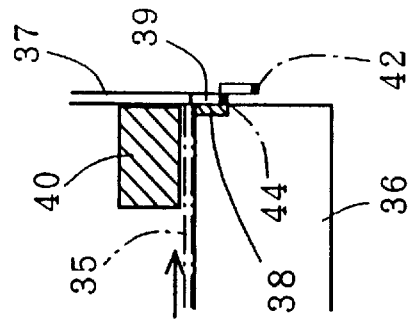
Figure 11C:
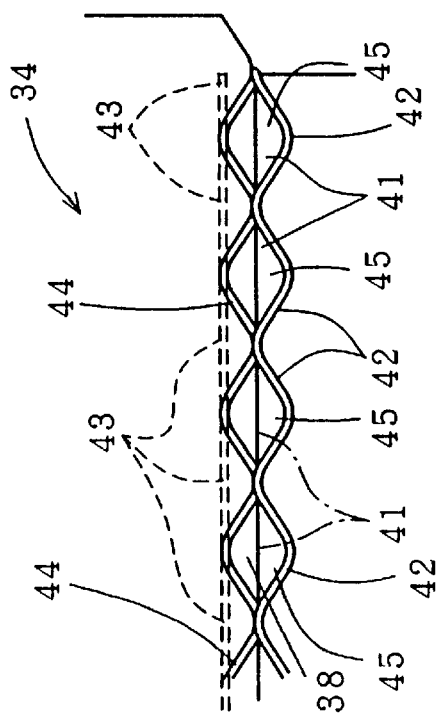
Figure 11D:
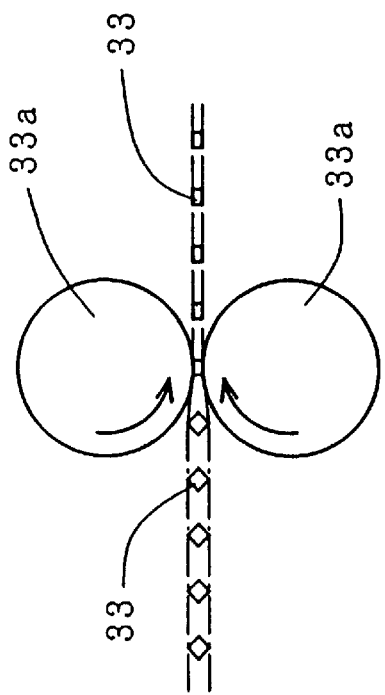

Several embodiments of this invention will now be described with reference to drawings. FIG. 1 presents the manufacturing process for the cladding material of this invention comprising an Fe-based metal substrate. As shown in (a), a Ni-based metal foil 2 as the Ni-based metal layer is placed on an Fe-based metal substrate ("Fe-based substrate", hereafter) 1 consisting of such material as carbon steel or stainless steel. Furthermore, a metal mesh 3 consisting of a stainless steel and an anticorrosive metal lining ("metal lining" or "lining", hereafter) 4 consisting of anticorrosive metal, such as Ti, Zr, and so on, are placed thereon in this order. In this embodiment, the Ni-based metal foil is composed by Ni-metal though, it may be composed by a Ni-alloy.

Figure 1A:
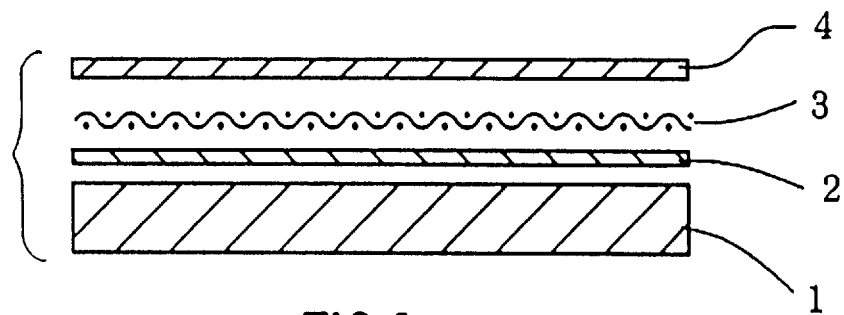
FIG. 1 is a conceptual figure showing the manufacturing process for a cladding material of this invention.
Figure 1B:
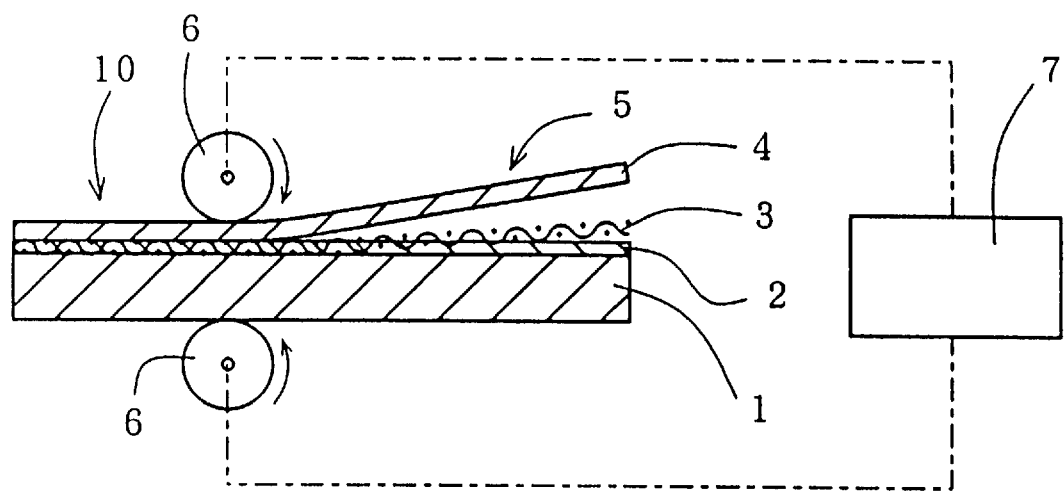
Figure 2:
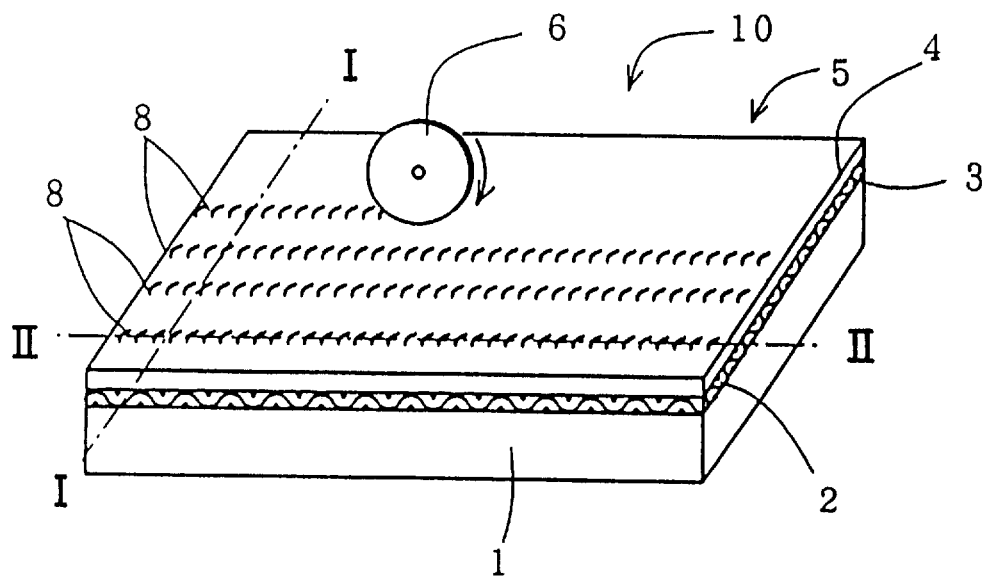
FIG. 2 is a perspective view showing the process for forming the seam welded zone.

After that, as shown in (b), the laminate 5 thereof is pinched between a pair of roller electrodes 6 in the laminating direction, and electric current is sent into the laminate 5 from the AC power supply 7 via the roller electrodes 6, while designated pressure is applied to the electrodes 6 by means of a loading means such as a pneumatic mechanism. The laminate 5 is heated thereat by the current supply as shown in FIG.2, the electrodes 6 are relatively rolled in the direction along the surface of the laminate 5 and forms linear seam welded zone 8, whereby the metal substrate 1, Ni-based metal foil 2, the metal mesh 3 and the metal lining 4 are to be bonded together and forms a cladding material 10. The seam welded zone 8 are provided in a form of plural lines extending in the direction along the surface of the laminate 5. The electric current may be supplied to the electrodes 6 either continuously or intermittently. In the following drawings, the thickness of the Ni-based metal foil 2, the metal mesh 3 and the metal lining 4 are presented exaggeratedly in some cases, so that the thickness thereof does not always coincide with that of the practical cladding material.

Figure 24:
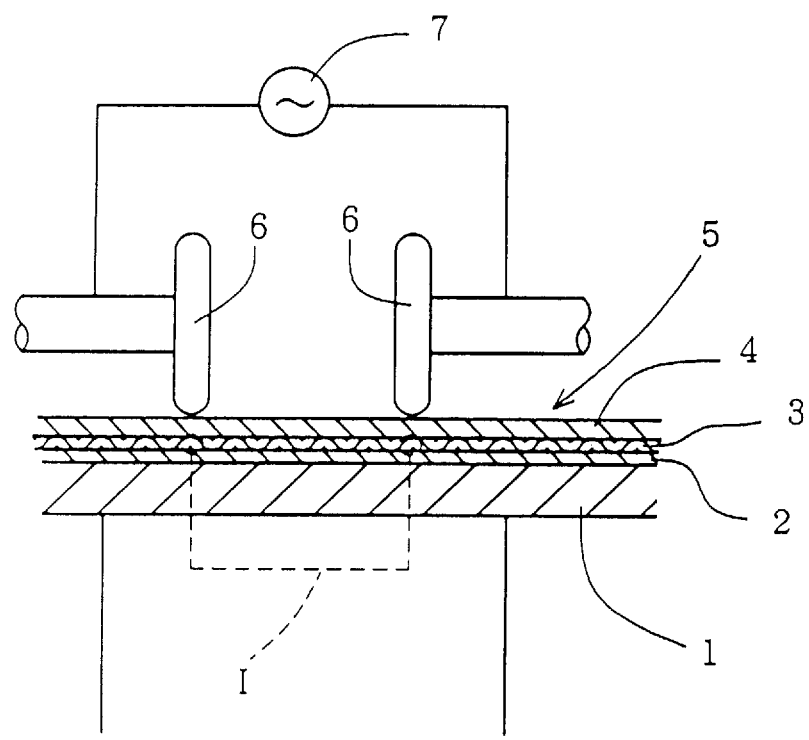
FIG. 24 is a schematic view showing the process for forming seam welded zone by using series seam welding.

As shown in FIG. 24, a method without pinching the laminate 5 between the roller electrodes 6, such as series seam welding, is also applicable. That is to say, a roller electrode 6 is arranged on the metal lining 4, and another electrode 6 is arranged on the same side. Electric current is sent into the laminate 5 along a path I starting from one electrode 6, passing through the laminate 5 across the thickness thereof, turning sideward along the laminate 5, then reaching to the other electrode 6 with passing through the laminate 5 again in the opposite direction.

Figure 3:
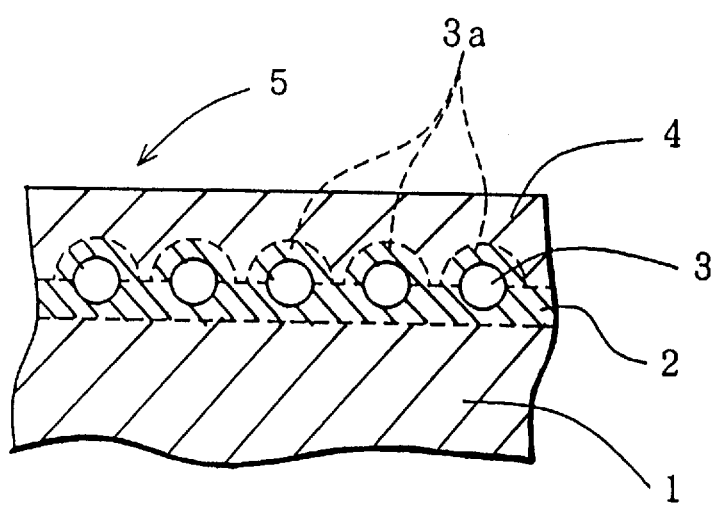
FIG. 3 is a B—B sectional view of FIG.2.
Figure 4:
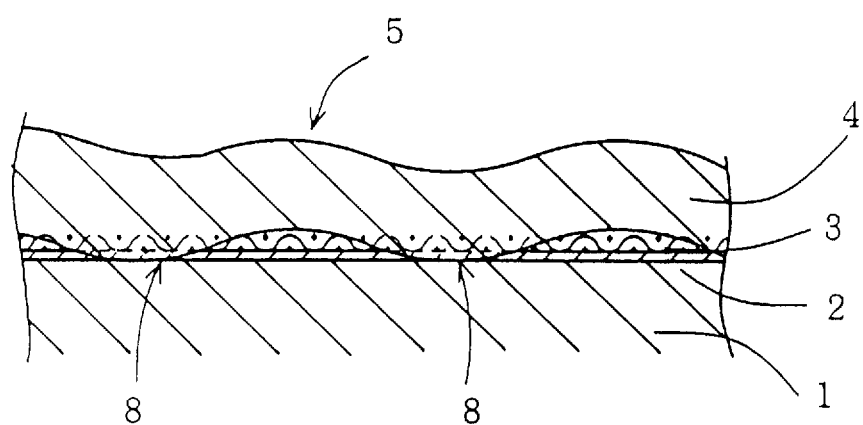
FIG. 4 is an A—A sectional view of FIG.2.

FIG. 3 and FIG. 4 present the cross-sectional structure expected for the cladding material 10 presented in FIG. 2 ( FIG. 3 shows the B—B cross section, and FIG. 4 shows the A—A cross section, respectively). The metal mesh 3 has a small cross section for the current path because of a number of openings formed therein. Furthermore, the contacting area with Ni-foil 2 or that with the metal lining 4 becomes also small, so that large resistance heat generates around the mesh 3. The metal lining 4 consists of Ti or Zr, so that it is softened more easily than the Fe-based metal substrate 1 by resistance heating. Therefore, the metal mesh 3 is to be intruded into the softened metal lining 4 receiving the pressure from the roller electrodes 6, whereby the Fe-based metal substrate 1 and the metal lining 4 are strongly bonded each other.

The Ni-based metal foil 2 generates a liquid phase by its own melting, or by melting along with a part of Fe-based metal substrate 1 or the metal mesh 3 due to the resistance heating. The liquid phase generated is supplied to the contacting part between the metal mesh 3 and the metal substrate 1. Ni, the main component of the Ni-based metal foil 2, has an excellent wettability or an interdiffusivity against an Fe-based material consisting of the metal substrate 1, so that the bonding force between the metal mesh 3 and the metal substrate 1 is enhanced.

Thus, as shown in FIG. 3, the metal lining 4 appears to be strongly bonded to the metal substrate 1 due to a multiplication between the intrusion effect of the metal mesh 3 and the brazing and soldering effect of the Ni-based metal foil 2. In some cases, a diffusion layer 3a may be formed around the region where the mesh 3 is intruded into the metal lining 4 due to a component diffusion therebetween.

As shown in FIG. 4, no bonding occurs between the layers 1–4 at the portion out of the seam welded zone 8. The total bonding force between the metal lining 4 and the metal substrate 1 over the cladding material 10 can be adjusted by changing the number and/or the width of the seam welded zone 8, or the distance between the seam welded zones 8. The width of the seam welded zone 8 can be adjusted by changing the width of the roller electrodes 6. Furthermore, a seam welded zone 8 with a particularly large width may be obtained by forming a plurality of linear zone juxtaposing or partly overlapping each other.

The thickness of the metal lining 4 is adjusted according to the environment where the cladding material 10 is applied. The thickness of the metal mesh 3 (or the diameter of the wire for the mesh 3), mesh opening, the material and the thickness of the Ni-based metal foil 2 are adjusted according to the material and the thickness of the metal lining 4 so that the bonding strength is optimized. When the materials and the dimensions for the layers 1–4 are determined, the condition of the seam welding, such as welding current, pressure from the roller electrodes 6, welding speed (rotation speed of the electrode 6, for example), welding time, and intermission are to be correspondingly determined. For example, the welding current is set so that no melting of the metal mesh 3 due to an excess resistance heat generation, or no bonding imperfection due to a lack of heat generation occurs. On the other hand, the pressure applied to the roller electrodes 6 are adjusted so that the metal mesh 3 is intruded into the metal lining 4 at a proper amount, and no excess intrusion of roller electrodes 6 to the surface of the laminate 5 occurs.

In a case of bonding the metal lining 4 made of Ti or Zr with the metal substrate 1 made of a carbon steel, the thickness T of the metal lining and the diameter M of the wires of the metal mesh 3 are adjusted so that the ratio M/T is in the range of 0.1–0.4. M/T less than 0.1 may cause an insufficiency of the bonding strength because of a lack of the intrusion of the metal mesh 3 into the metal lining 4. On the other hand, M/T exceeding 0.4 may cause too much intrusion of the metal mesh 3 into the metal lining 4, which leads to an imperfection in the appearance of the cladding material 1 due to a protrusion of metal mesh 3 on the surface of the lining 4, or causes cracks in the lining 4 leading to an insufficiency of the anticorrosion effect thereof against the metal substrate 1. M/T is preferably set in the range of 0.150–0.30.

The mesh space D (defined as the distance between the inner sides of adjacent wires, i.e., the width of the interval formed between the wires) is adjusted so that the ratio D/M is in a range of 1–10. D/M less than 1 may cause an insufficiency of the bonding strength since the mesh opening becomes too small, and the intrusion of the metal mesh 3 into the lining 4 becomes insufficient. Furthermore, the liquid phase generated by the melting of the Ni-based metal foil 2 hardly penetrates through the mesh opening, and the effect of soldering the lining 4 with the substrate 1 through the mesh opening becomes insufficient. On the other hand, D/M exceeding 10 may cause an insufficiency of the bonding strength since the wire spacing of the mesh 3 intruded into the lining 4 becomes too large. D/M is preferably adjusted in the range of 1.5–7.

Figure 5:
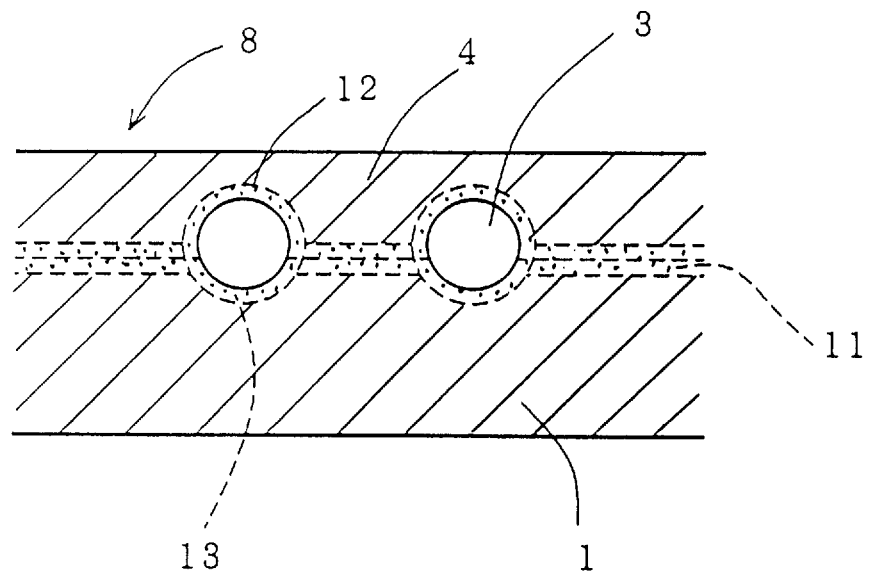
FIG. 5 is a schematic sectional view of the seam welded zone of a cladding material using only a metal mesh.

For the constitution using a laminate wherein only a metal mesh 3, or a Ni-based or Cu-based metal layer is inserted between the metal lining 4 and the metal substrate 1, the seam welded zone 8 is formed according to the same principle as shown in FIG. 1. FIG. 5 presents the structure of the seam welded zone 8 assumed for the constitution comprising a metal mesh 3 made of a stainless steel and a metal lining 4 made of Ti or Zr. The metal mesh 3 is to be secured to the metal lining 4 by intruding largely thereinto. Furthermore, the metal mesh 3 and the metal substrate 1 appear to be bonded according to a formation of a component diffusion layer 13 due to resistance heating. A small amount of component diffusion layer 11 may be formed in some cases at the part where the metal lining 4 and the metal substrate 1 contact directly each other. Furthermore, a component diffusion layer 12 may be formed around the part where the metal mesh 3 is intruded into the metal lining 4. In this case, t he aforementioned mesh space D, wire diameter M and the thickness T of the metal lining 4 are preferably set so as to satisfy the conditions designated for the cladding material using a Ni-based metal foil (Ni-based metal layer) 2.

Figure 6:
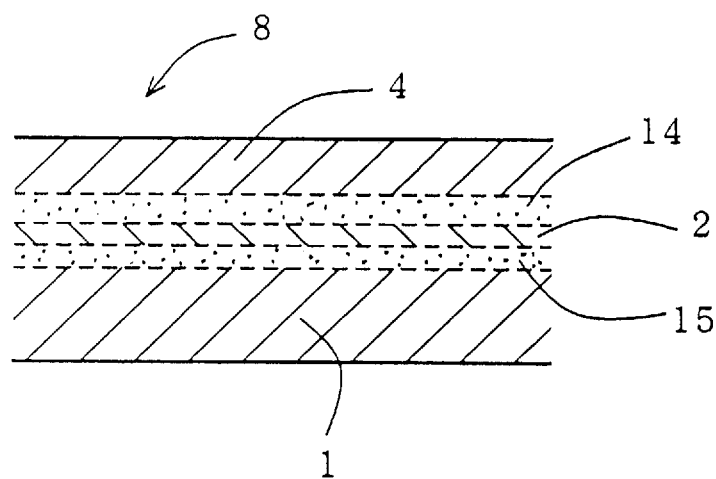
FIG. 6 is a schematic sectional view of the seam welded zone of a cladding material using only a Ni or Cu-based metal layer.

In a cladding material comprising no metal mesh 3, for example, that comprising a Ni-based metal foil 2 and a Nb thin plate as the metal lining 4, the structure of the seam welded zone 8 is assumed to be the one presented in FIG. 6. The Ni-based metal foil 2 is fused by a resistant heat generation around the contacting part of the foil 2 and the metal lining 4 or the metal substrate 1, and a component diffusion layer 14 and 15 are formed between the generated liquid phase and the metal lining 4, and the metal substrate 1, respectively, whereby the metal lining 4 and the metal substrate 1 are bonded.

Figure 7A:
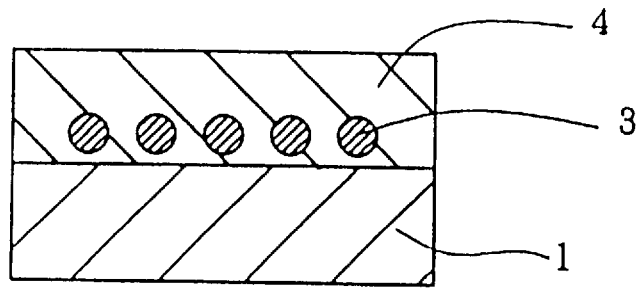
FIGS. 7a–7c are schematic views showing the difference in effects between the mode using one metal mesh and that using two metal meshes.
Figure 7B:
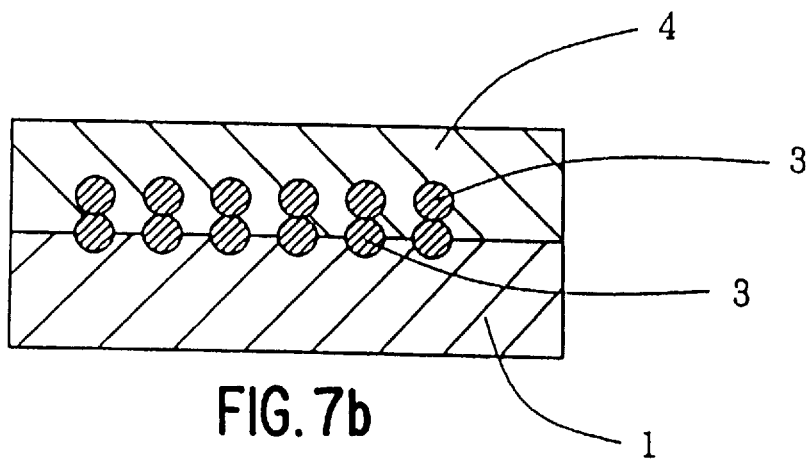

In a case of bonding a particularly thick metal lining 4 with a metal substrate 1 by using a metal mesh 3, a high welding current or a long welding time is needed for securing sufficient welding current density. The metal mesh 3, however, has so small contacting area with the metal lining and so high specific resistivity that the heat generation around the metal mesh 3 becomes too large with increasing the welding current. This may lead to a result that the metal mesh 3 is buried into the metal lining 4 which is softened too much due to an excess heat generation, as shown in FIG. 7(a), and the bonding effect according to the intrusion of the metal mesh 3 may become insufficient. In this case, as shown in FIG. 7(b), it is effective to laminate two or more metal meshes 3 since one of the meshes 3 may be located between the metal substrate 1 and the metal lining 4 even if the other mesh 3 is buried.

Figure 7C:
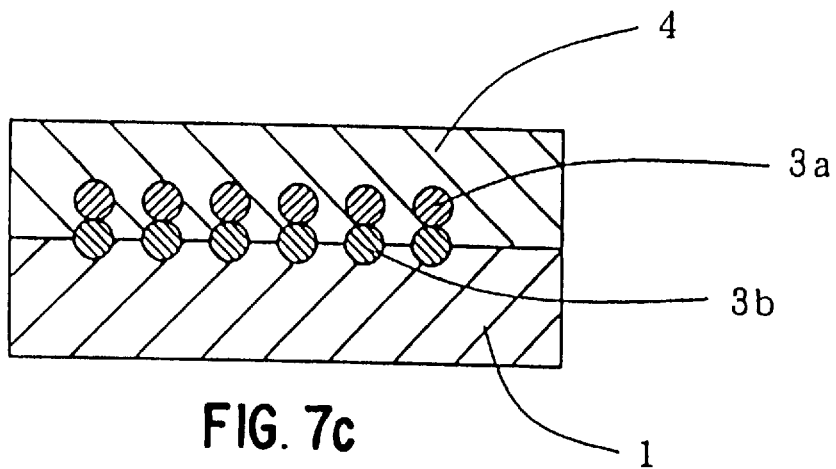

As shown in FIG. 7(c), two metal meshes 3a and 3b made of different materials may be used. For example, in a case of using a metal lining 4 made of Ti or Zr, a mesh consisting of a material with a high intrusion effect for the metal lining, such as Fe-based mesh 3a (a stainless steel mesh, for example) may be located on the side of the metal lining 4, and a mesh consisting of a material with a high affinity both for the Fe-based mesh 3a and the Fe-based metal substrate 1, such as Ni-based mesh 3b (Ni mesh, for example) may be located on the side of the metal substrate 1. According to this constitution, the bonding strength of the cladding material improves since the Fe-based metal mesh 3a is strongly bonded to the Fe-based metal substrate 1 by the Ni-based mesh 3b. In this case, it is possible to use a three-layered metal mesh wherein a Ni-based mesh is inserted between two Fe-based meshes.

Figure 8A:
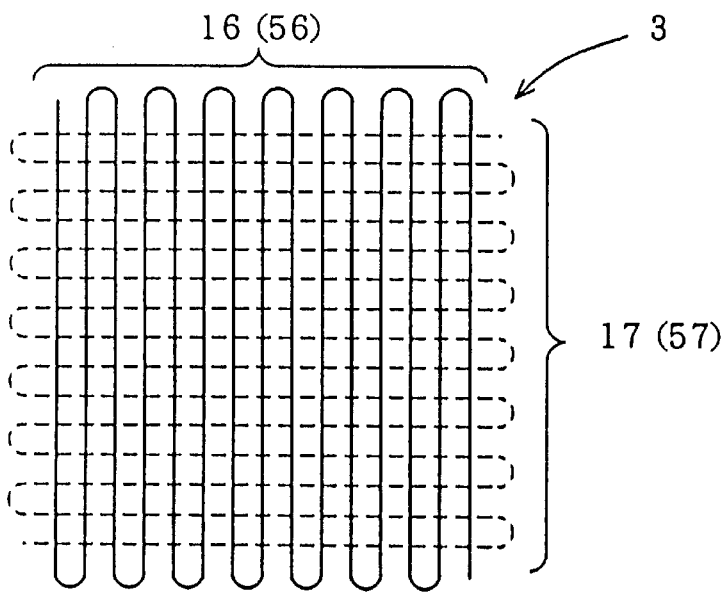
FIGS. 8a–8c are schematic views showing a composite metal mesh consisting of two sets of metal wires consisting of different materials from each other.

On the other hand, it is possible to constitute the lengthwise and breadthwise wires of the mesh 3 with materials having different specific resistivities for adjusting the total electrical resistivity of the metal mesh 3 according to the combination of the materials. FIGS. 8(a) and (b) present examples thereof, wherein two sets of wires 16 and 17 are intersecting each other, wherein one set 16 consist of a stainless steel, and wherein the other set 17 consist of a carbon steel which has a lower specific resistivity than the stainless steel. The surface of the carbon steel wires may be coated with Zn for an anticorrosion purpose. Ni-based or Cu-based wires 17 which has a lower specific resistivity than the stainless steel wires, are also available in stead of carbon steel wires. Furthermore, as shown in FIG. 8(c), each of lengthwise and breadthwise wires of the mesh 3 can be constituted with two kinds of wires 18 and 19, which are made of different materials and arranged alternately.

Figure 9:
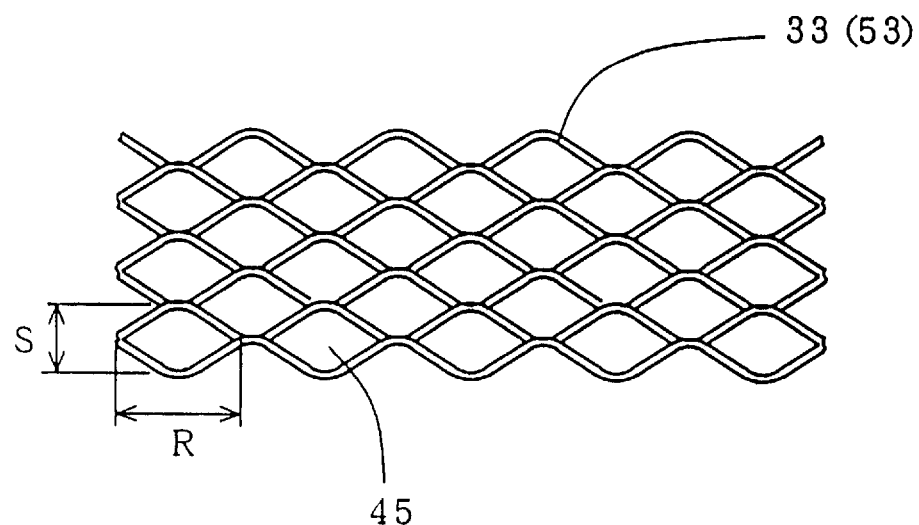
FIG. 9 is an elevation of one of examples of expanded metals.
Figure 10:
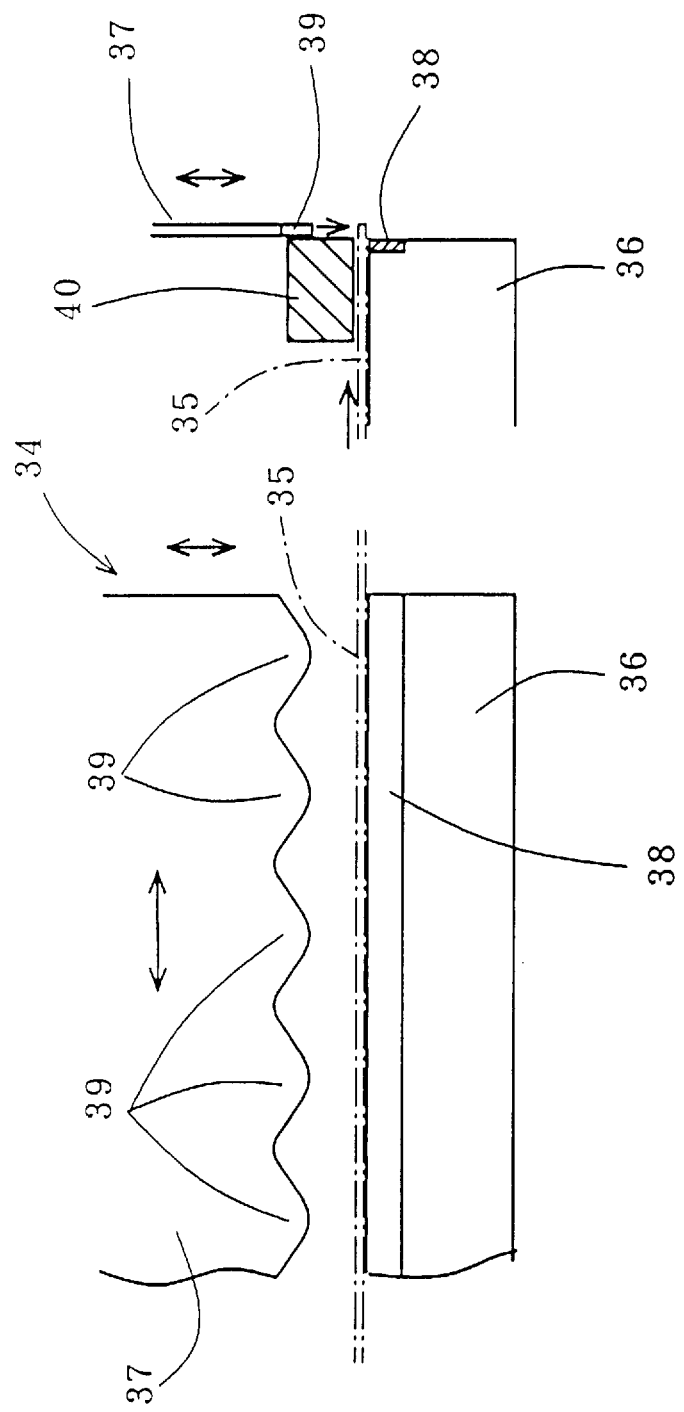
FIG. 10 is a conceptual view of an apparatus for producing an expanded metal.

The metal mesh 3 can be formed as an expanded metal 33, as shown in FIG. 9, the opening of which is formed by making staggered cuts in a metal plate over the whole part thereof so that each cut passes through the thickness of the metal plate, and expanding the metal plate in a direction intersecting the length of the cuts thereby opening each cut. Such expanded metal 33 can be produced, for example, by using an apparatus 34 presented in FIG. 10.

The apparatus 34 comprises a table 36 for supporting a metal sheet (plate) 35 on the upper surface thereof, and a blade 37 mounted so as to move up and down along the end surface of the table 36. Although they are not presented in the figure, the apparatus 34 is equipped with following elements:

an elevating mechanism for moving the blade 37 up and down;

a traversing mechanism for moving the blade 37 in a transverse direction relatively against the metal plate 35 on the table 36;

a sheet feeding mechanism for feeding the metal sheet 35 on the table 36 intermittently at a designated pitch toward the end surface of the table 36 to which the blade 37 corresponds.

In the lower portion of the blade 37, a plurality of elementary blades 39 are formed in a wave-like shape. On the other hand, a linear blade 38 is formed along the upper edge of the table 36 corresponding to the elementary blades 39. 40 is a holding plate for inhibiting the metal sheet 35 rising up from the surface of the table 36.

The operation of the apparatus 34 is described in the following. As shown in FIG. 11(a), the metal sheet 35 is projected for one pitch from the end of the table 36, and then the blade 37 is moved down. The metal sheet 35 is sheared between the blade 38 and the blade 39 in the thickness direction, and a plurality of cuts 41 are formed corresponding to the elementary blades 39 in a shape of a broken-line, while the projected part 42 of the metal sheet 35 divided by the cuts 41 is pressed down by the blade 39, thereby deforming downward and opening each cut 41.

After that, as shown in FIG. 11(b), the blade 37 is lifted up and traversed along the width of the table 36 with a distance equivalent to the half of the length of each cut 41, while the metal sheet 35 is projected for one more pitch from the end of the table 36. Then, the blade 37 is moved down again and forms another series of cuts 43 almost parallel to the cuts 41 at the position shifted half of the length of each cut 41 (i.e., staggeredly), pressing down the projected part 44 of the metal sheet 35. Thus, as shown in FIG. 11(c), a series of rhombic mesh opening 45 are formed in the direction of the width of the table 36 between the projected part 44 and 42. Then, the blade 37 is lifted again and moved back to the original position by traversing along the width of the table 36 in the opposite direction, whereby the apparatus 34 returns to the state of FIG. 11(a). By repeating the process described above, an expanded metal 33 as shown in FIG. 9 is to be produced. Furthermore, a rolling may be performed against the obtained expanded metal 33 by using rolls 33a.

In a case of bonding the metal lining 4 made of Ti or Zr with the metal substrate 1 made of a carbon steel, the thickness T of the metal lining and the thickness M of the metal sheet used for the expanded metal 33 are adjusted so that the ratio M/T is in the range of 0.1–0.6. M/T less than 0.1 may lead to an insufficiency of the bonding strength due to a lack of the intrusion of the expanded metal 33 into the metal lining 4. On the other hand, M/T exceeding 0.6 may cause too much intrusion of the expanded metal 33 into the metal lining 4, which leads to an imperfection in the appearance of the cladding material 10 due to a protrusion of the expanded metal 33 on the surface of the lining 4, or causes cracks in the lining 4 leading to an insufficiency of the anticorrosion effect thereof against the metal substrate 1. M/T is preferably set in the range of 0.2–0.5.

The size D of the rhombic opening 45, which is defined as the average of the long diagonal line R and the short diagonal line S, i.e., (R+S)/2, is adjusted so that the ratio D/M is in a range of 1.1–40. D/M less than 1.1 may cause an insufficiency of the bonding strength since the size of opening 45 becomes too small, and the intrusion of the expanded metal 33 into the lining 4 becomes insufficient. On the other hand, D/M exceeding 40 may cause an insufficiency of the bonding strength since the intruding amount of the expanded metal 33 into the lining 4 becomes too small. D/M is preferably adjusted in the range of 2–30.

Figure 12A:
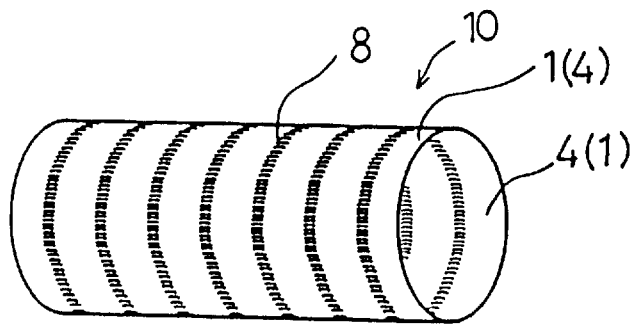
FIGS. 12a–12c are perspective views showing a cladding material wherein the metal substrate is formed in a cylindrical shape.
Figure 12B:
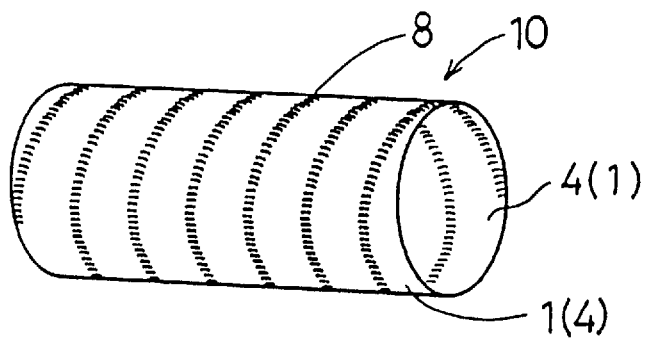
Figure 12C:
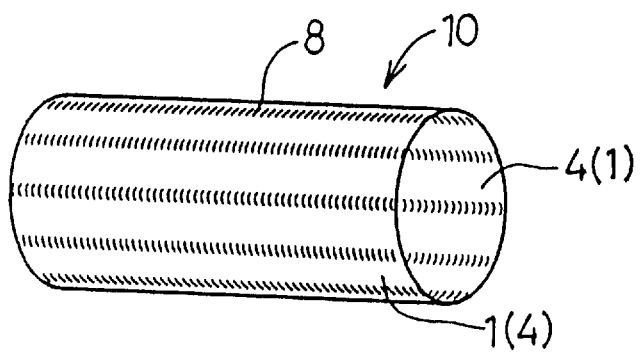

Several embodiments of the cladding materials comprising an Fe-based substrate will now be described in the following. FIG. 12 presents an example of a cladding material 10 wherein the metal substrate 1 is formed in a cylindrical shape. The metal lining 4 covers the inner surface of the cylinder (or the outer surface of the cylinder; in this case, the location of the substrate 1 and the lining 4 is reversed from those presented in FIG. 12). The seam welded zone 8 can be formed in a shape of plural lines along the periphery of the cylinder (FIG. 12(a)), in a shape of a helical line (FIG. 12(b)), or in a shape of plural linear lines extending along the axial direction of the cylinder and arranged at a designated distance along the peripheral direction thereof (FIG. 12(c)). Such shape of the cladding material 10 may be preferably used for shell straight portions of columns and vessels, reactors or heat exchangers, or pipes with corrosion resistive lining inside or outside thereof.

Figure 13A:
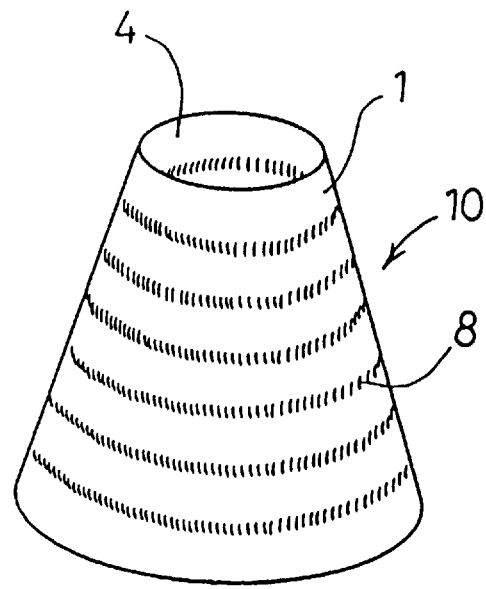
FIGS. 13a–13b are perspective views showing a cladding material wherein the metal substrate is formed in a conical shape.
Figure 13B:
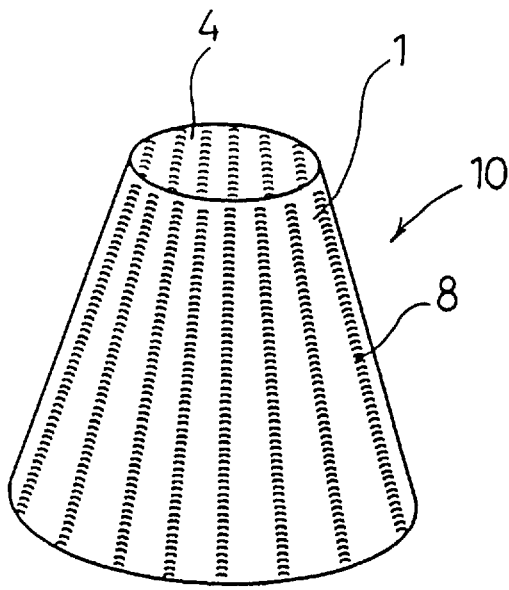

FIG. 13 present an example of a cladding material 10 wherein the metal substrate 1 is formed in a hollow conical or a hollow truncated cone-like shape, an d the metal lining 4 covers the inside thereof. The seam welded zone 8 is formed along the peripheral direction (FIG. 13(a)), or along the generating line thereof (FIG. 13(b)). Such shape of cladding material is preferably used for a narrower part consisting the upper or lower portions of columns and vessels, or reactors.

Figure 14:
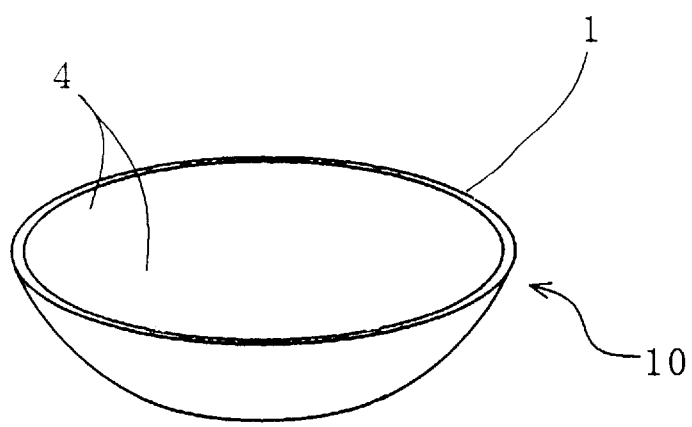
FIG. 14 is a perspective view showing a cladding material wherein the metal substrate is formed in a shape of flat cover.
Figure 15A:
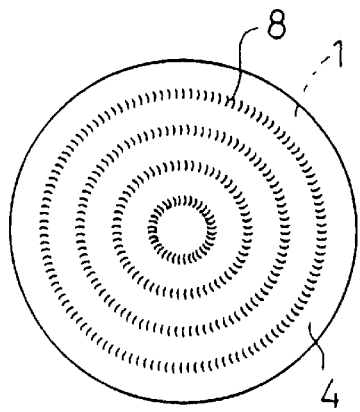
FIGS. 15a–15h are schematic views showing the formation pattern of the seam welded zone for a cladding material in FIG. 14.
Figure 15B:
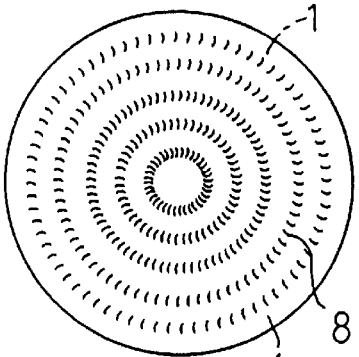
Figure 15C:
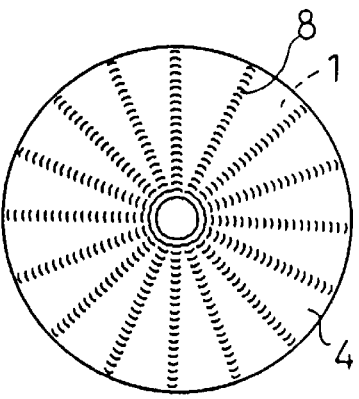
Figure 15D:
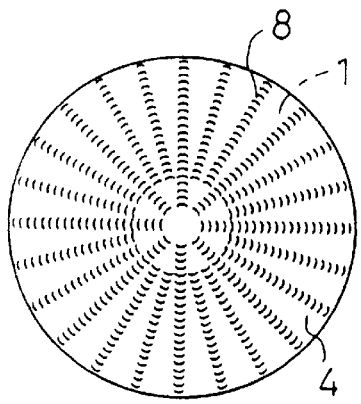
Figure 15E:
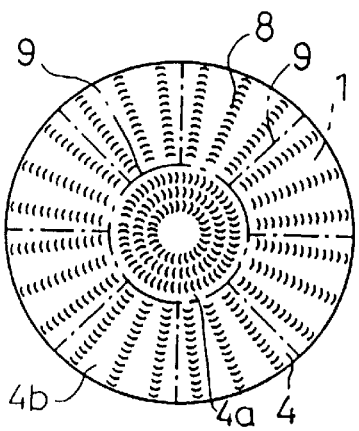
Figure 15F:
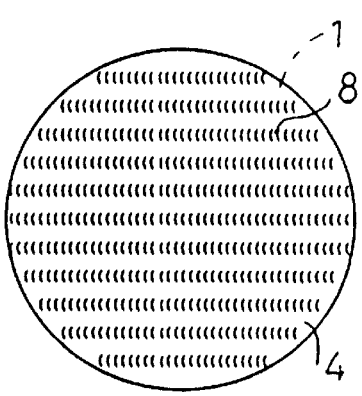

In the cladding material presented in FIG. 14, the metal substrate 1 is formed in shape of a flat cover, which has a circular shape in its elevation, and the center portion of which swells outwardly in a shape of a convex curved surface. The inner side (i.e., the concave side) of the substrate 1 is covered with the metal lining 4. Such shape may be preferably used for heads of columns and vessels, or heat exchangers. FIG. 15 presents several examples of the formation pattern of the seam welded zone 8. In FIGS. 15(a) and (b), the seam welded zone 8 is formed in a shape of uniaxial circles. In FIGS. 15(c) and (d), the seam welded zone 8 is formed in a shape of radial linear lines. In FIG. 15(e), the seam welded zone 8 is formed in a shape of a combination of uniaxial circles and radial linear lines. In FIG. 15(f), the seam welded zone 8 is formed in a shape of a plurality of parallel lines extending along the diameter of the metal substrate 1.

Figure 15G:
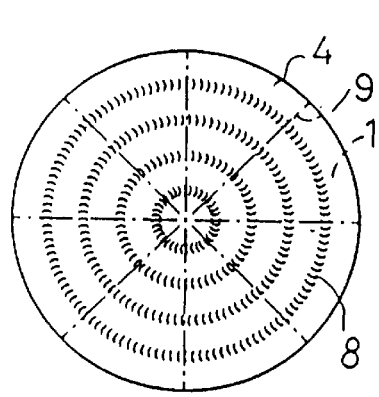
Figure 15H:
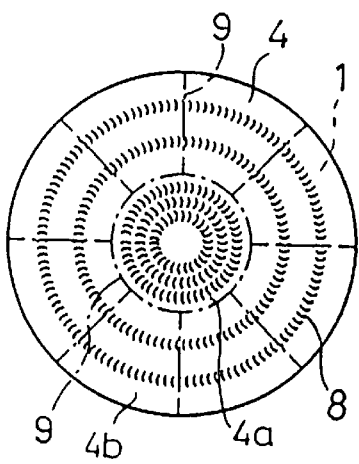

The metal lining 4 can be formed as an integrated portion composed of a plurality of segments arranged so as to cover the whole inner surface of the substrate 1. These segments are welded each other by means of, for example, inert gas shielded tungsten arc welding. FIG. 15(g) presents an example wherein the metal lining 4 is composed of radially divided segments. The segments are integrated by the joint welded zones 9 formed in the butt portions of the segments, and bonded to the metal substrate 1 by the seam welded zones 8. The seam welded zones 8 are formed in a shape of uniaxial circles so as to evade the joint welded zones 9. In the examples shown in FIGS. 15(e) and (h), the metal lining 4 is composed of a circular inner segment 4a and a doughnut-like outer segment 4b which is arranged outside of the segment 4a and radially divided into plural segments. Each butt portion between the segments is bonded by corresponding joint welded zones 9. The metal substrate 1 may be divided into an inner portion corresponding to the inner segment 4a of the metal lining 4 and an outer portion corresponding to the outer segment 4b thereof. In this case, the lining segment 4a and 4b can be bonded corresponding inner and outer portions of the substrate 1 by seam welding before integration, respectively. After of all, each portion of the substrate 1 and the lining segment 4a and 4b seam-welded thereto are to be bonded each other by welding, and so on.

Figure 16A:
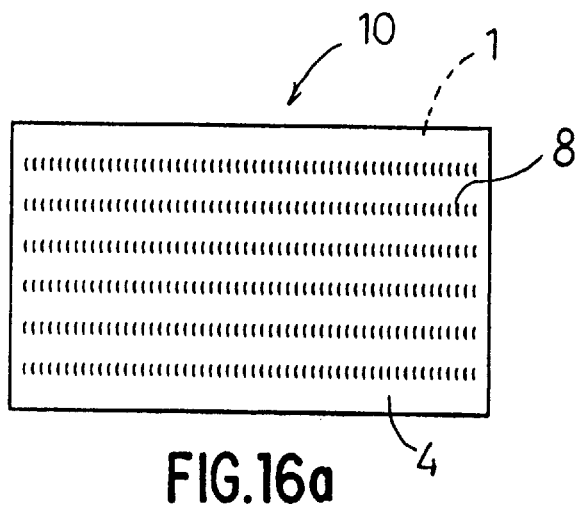
FIGS. 16a–16c are schematic views showing a cladding material wherein the metal substrate is formed in a rectangular plate.
Figure 16B:
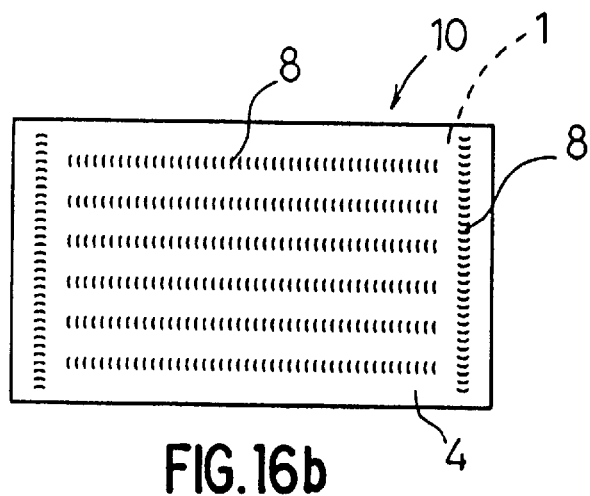
Figure 16C:
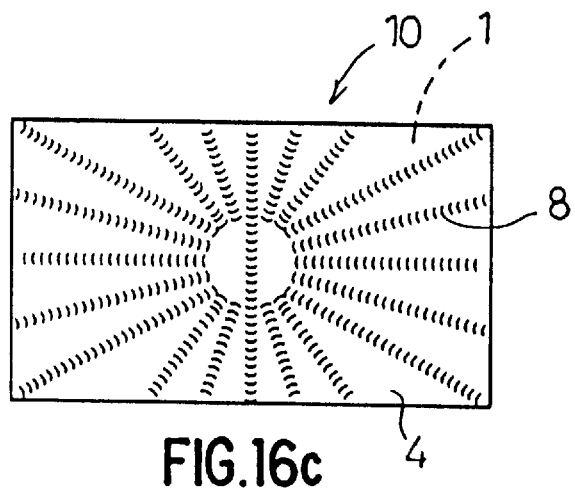
Figure 17A:
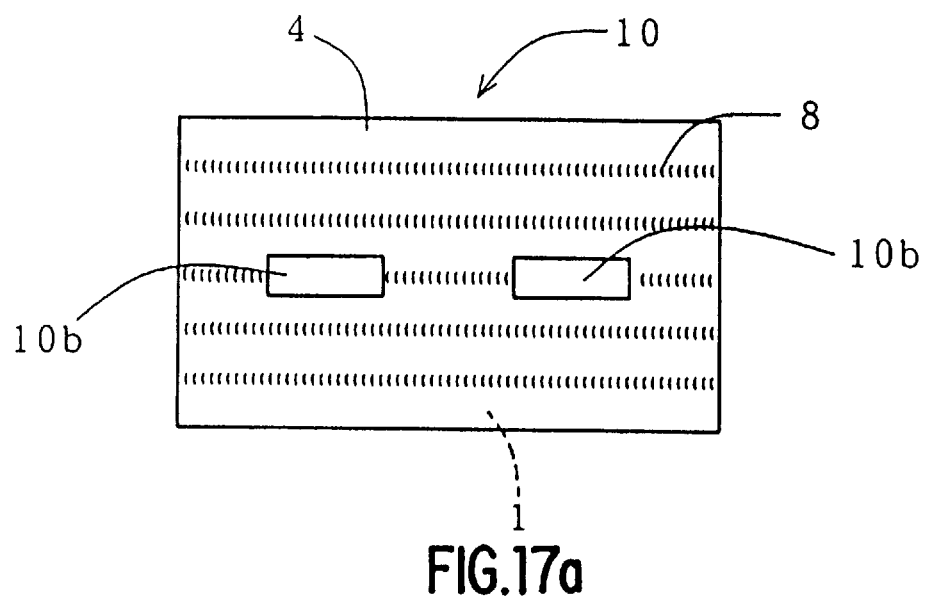
FIGS. 17a–17b present an elevation and a side view showing a cladding material wherein the seam welded zone is formed evading protruded portions on the plate-like metal substrate.
Figure 17B:
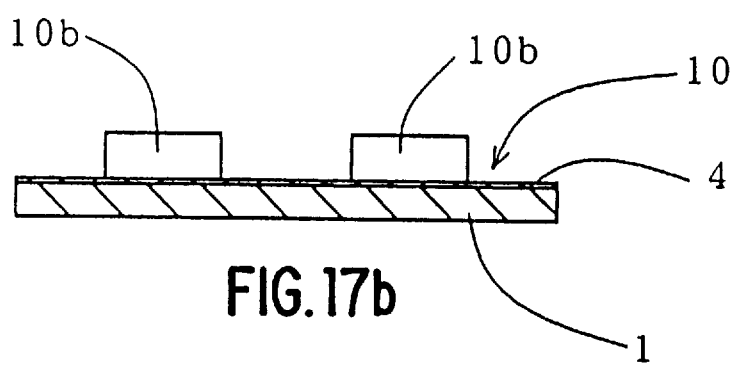

FIG. 16 presents an example of a cladding material wherein the metal substrate 1 is formed in a rectangle plate. In FIG. 16(a), the seam welded zone 8 is formed in a shape of a plurality of linear lines which extend along one edge of the cladding material 10 and are arranged at a designated distance along the edge intersecting with said one edge. In FIG. 16(b), additional linear seam welded zones 8 are formed corresponding to both the end of the zones 8. In FIG. 16(c), the seam welded zones 8 is formed in a shape of a plurality of radial linear lines. Furthermore, when a protruded portion 10b is formed on the metal substrate 1 as shown in FIG. 17, the seam welded zone 8 can be formed so as to evade the portion 10b.

Figure 18A:
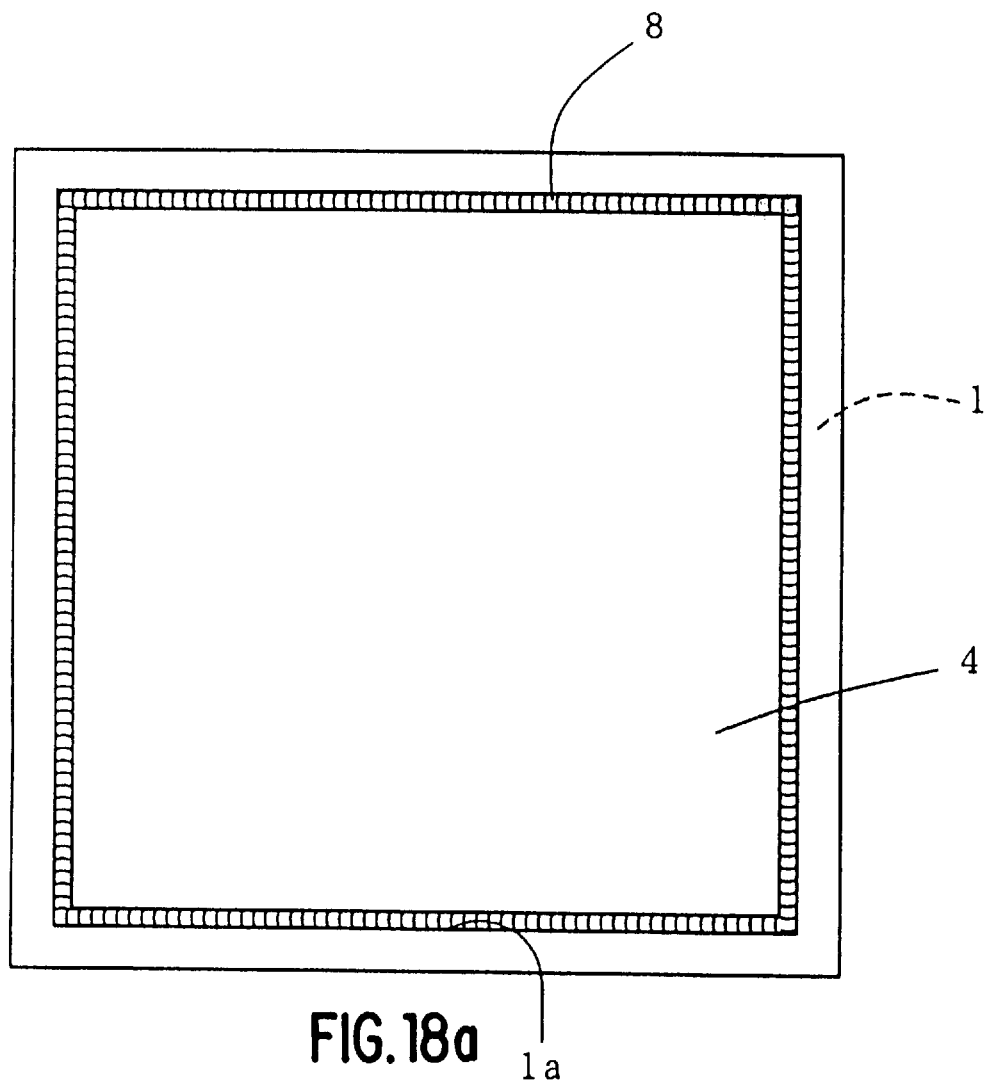
FIGS. 18a–18b present an elevation and a side view showing a cladding material wherein the seam welded zone is formed only in the circumferential region of the metal substrate.
Figure 18B:
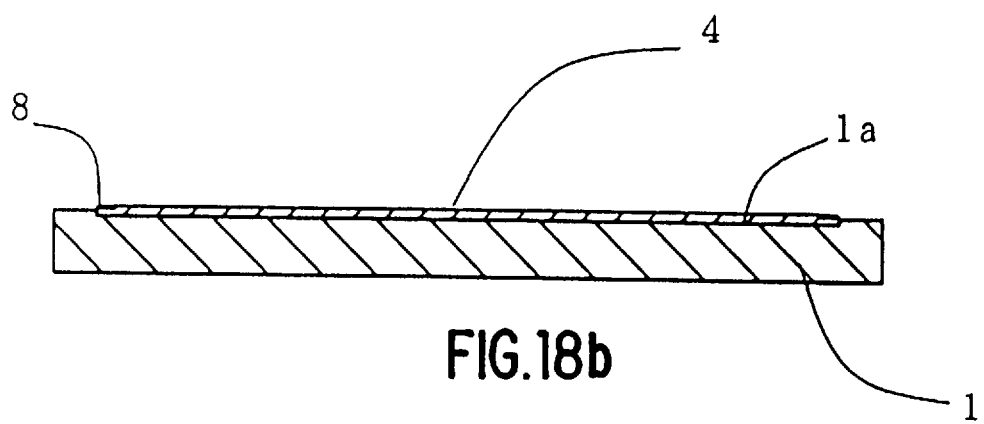
Figure 19A:
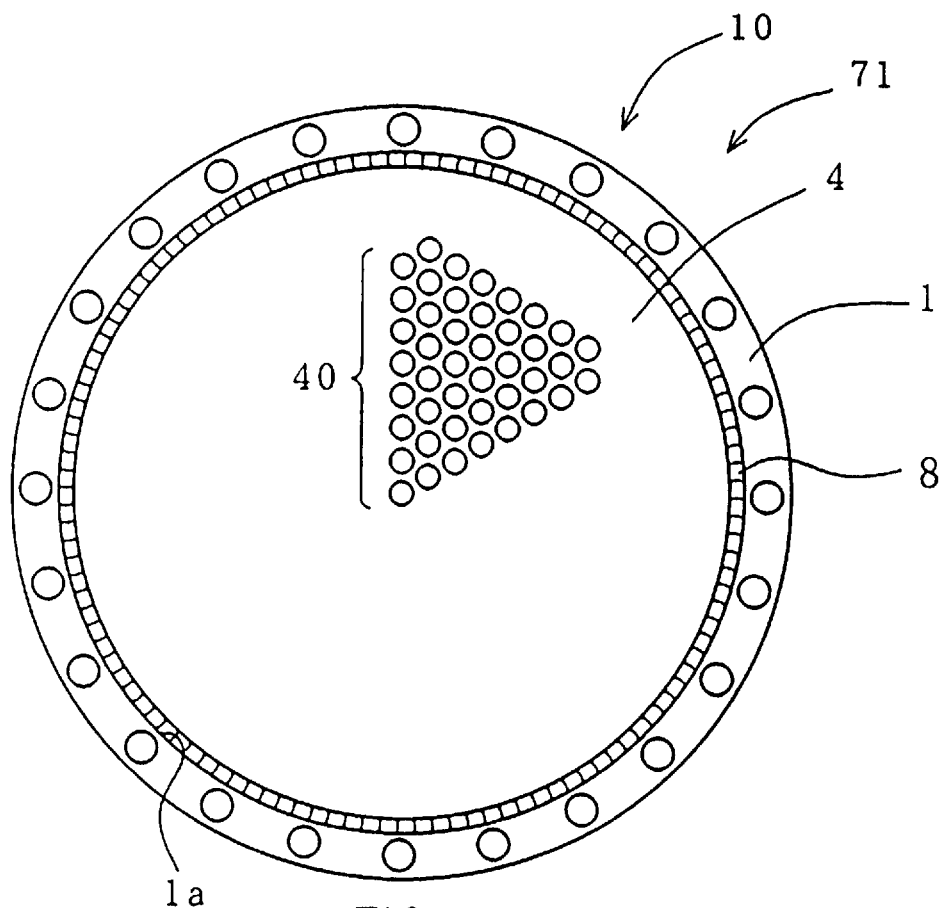
FIGS. 19a–19b present an elevation and a side view showing a cladding material wherein many pipes are connected on the metal lining.
Figure 19B:
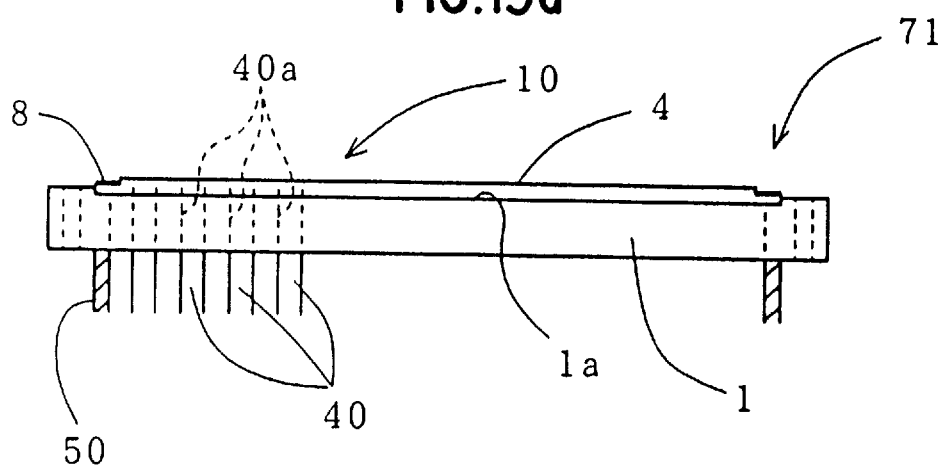

In the cladding material presented in FIG. 18, a plate-like metal lining 4 is engaged to a shallow concave 1a which is formed in a corresponding shape on a thick-plate like metal substrate 1, and a seam welded zone 8 is formed only in the portion along the edge of the metal lining 4. On the other hand, FIG. 19 shows an example that the cladding material 10 is applied to a tube sheet 71 of a heat exchanger. The tube sheet 71 can be produced according to the following method. First of all, many through holes 40a are preliminarily formed in the metal substrate 1 and the metal lining 4, respectively. The metal lining 4 is overlapped on the metal substrate 1, and a seam welded zone 8 is formed in the overlapping portion thereof. Then, the metal substrate 1 is integrated with a cylindrical shell straight portion 50 by means of welding. Finally, pipes 40 are inserted into each through hole 40a so that the end surface of each pipe 40 coincides to that of the metal lining 4, and then the circumferential portion of the pipes 40 are bonded to the metal lining 4 by conventional welding.

Next, several embodiments of the cladding material comprising a Cu-based metal substrate will now be described in the following. The fundamental point of the manufacturing process thereof is, however, based on almost the same principle of that for the cladding material using an Fe-based metal substrate, so that the different point thereof will be mainly described.

Figure 20:
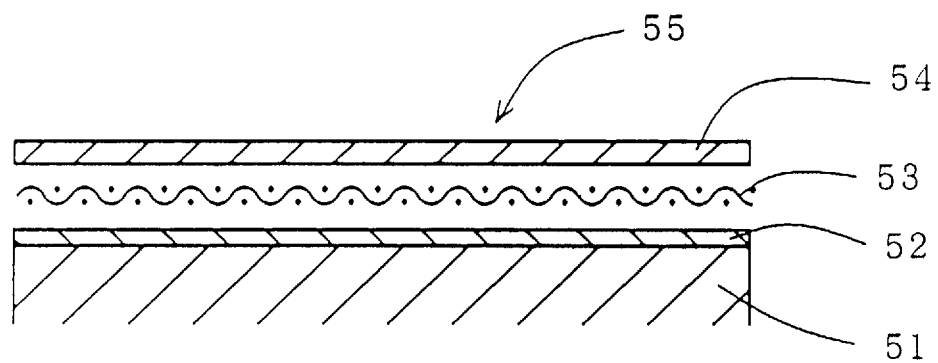
FIG. 20 is a schematic view showing a cladding material using a Cu-based metal substrate.

In the embodiment presented in FIG. 20, a layer of Sn-37 wt %Pb alloy ("soft solder layeric", hereinafter) 52 as an intermediate metal layer is formed on the surface of a Cu-based metal substrate 51, and a metal mesh 53 and a metal lining 54 consisting of anticorrosive metal, such as Ti, Zr, and so on, is placed thereon, thereby forming a laminate 55. The soft solder layer 52 can be formed by applying a paste-like mixture of an alloy powder and flux (such as solder paste) on the surface of the metal substrate 51. The soft solder layer 52 can be formed also by using an alloy foil or by a hot dipping method.

Figure 8B:
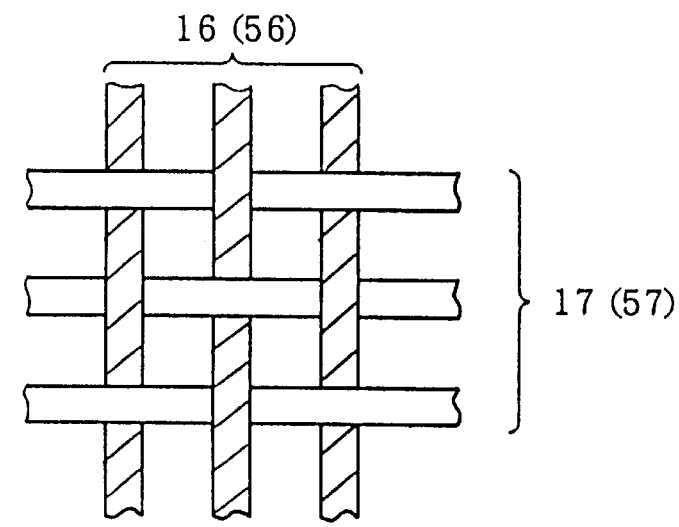
Figure 8C:
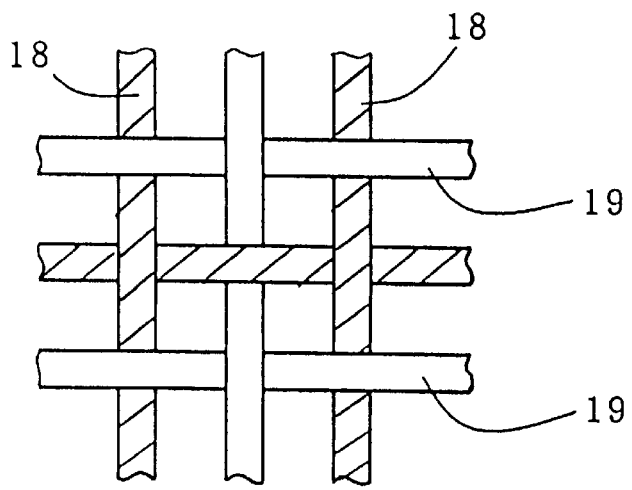
Figure 21:
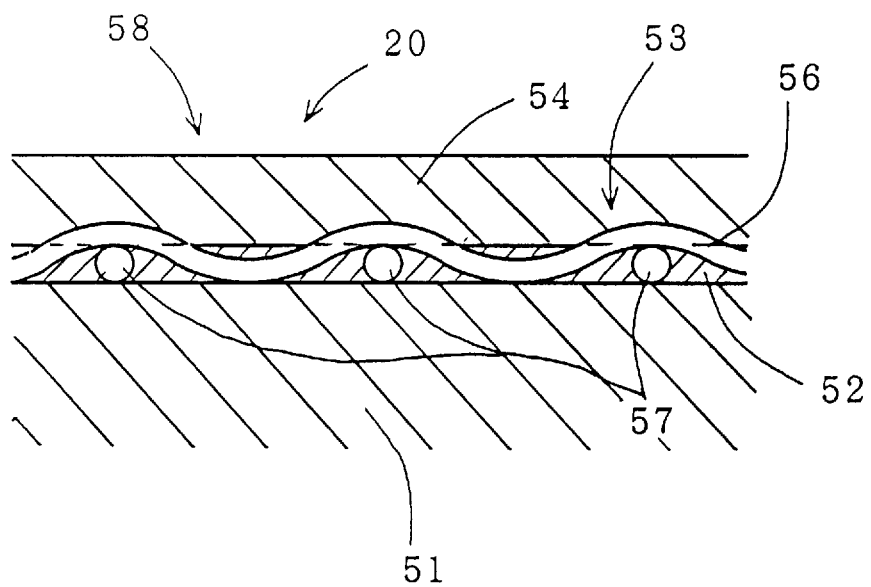
FIG. 21 is a schematic sectional view enlarging the seam welded zone of the cladding material in FIG.20.

As shown in FIG. 8, the metal mesh 53 is composed of two sets of metal wires 56 and 57 intersecting each other, one of which consist of a stainless steel (56), and the other of which consist of Cu (57). When electric current is sent to the laminate 55, resistance heat generation extensively occurs around the metal mesh 53, where the cross section for the electric current is small, as well as in the cladding material comprising an Fe-based metal substrate. The Cu wires 57 of the metal mesh 53 have a small specific resistance, so that resistance heat generation is to occur mainly around the part where the stainless steel wires 56 and the metal lining 54, or the part where the stainless steel wires 56 and soft solder layer 52 are contacting each other. The seam welded zone 58 is assumed to have a structure as presented in FIG. 21. The stainless steel wires 56 of the metal mesh 53 intrude relatively largely into the metal lining 54 softened by the resistance heat generation, receiving to the pressure from the roller electrodes 6 (FIG. 1), while the Cu wires 57 are bonded to the Cu-based metal substrate 51 by the soft solder layer 52 fused by the heat generation. Thus, the metal lining 54 and the Cu-based metal substrate 51 are to be bonded by the metal mesh 53 and the soft solder layer 52, thereby forming a cladding material 20.

In a case of bonding the metal lining 54 made of Ti or Zr with the Cu-based metal substrate 51, the thickness of the metal lining T and the diameter M of the wires of the metal mesh 53 are preferably adjusted so that the ratio M/T is in the range of 0.1–0.4, more preferably in the range of 0.15–0.3. Furthermore, the mesh space D of the metal mesh 53 (defined as the distance between the inner sides of adjacent wires, i.e., the width of the interval formed between the wires) is preferably set so that the ratio D/M is in a range of 1–10, more preferably in the range of 1.5–7.

Several embodiments of the cladding materials comprising a Cu-based substrate will now be described in the following. In the cladding material 20 presented in FIG. 22(a), the metal substrate 51 comprises a main body 51a formed in an elongated rectangle shape, supporting portions 51b which protrude upwardly from each end portion of the main body 51a, and a projecting portion 51c which project outwardly from the upper end part of each supporting portions 51b. Whole surface of the portions 51a–51c are covered with a metal lining 54 consisting of an anticorrosive metal, such as Ti, Zr, and so on, and seam welded zones 58 are formed on the main body 51a and on the projecting portions 51c.

Figure 22:
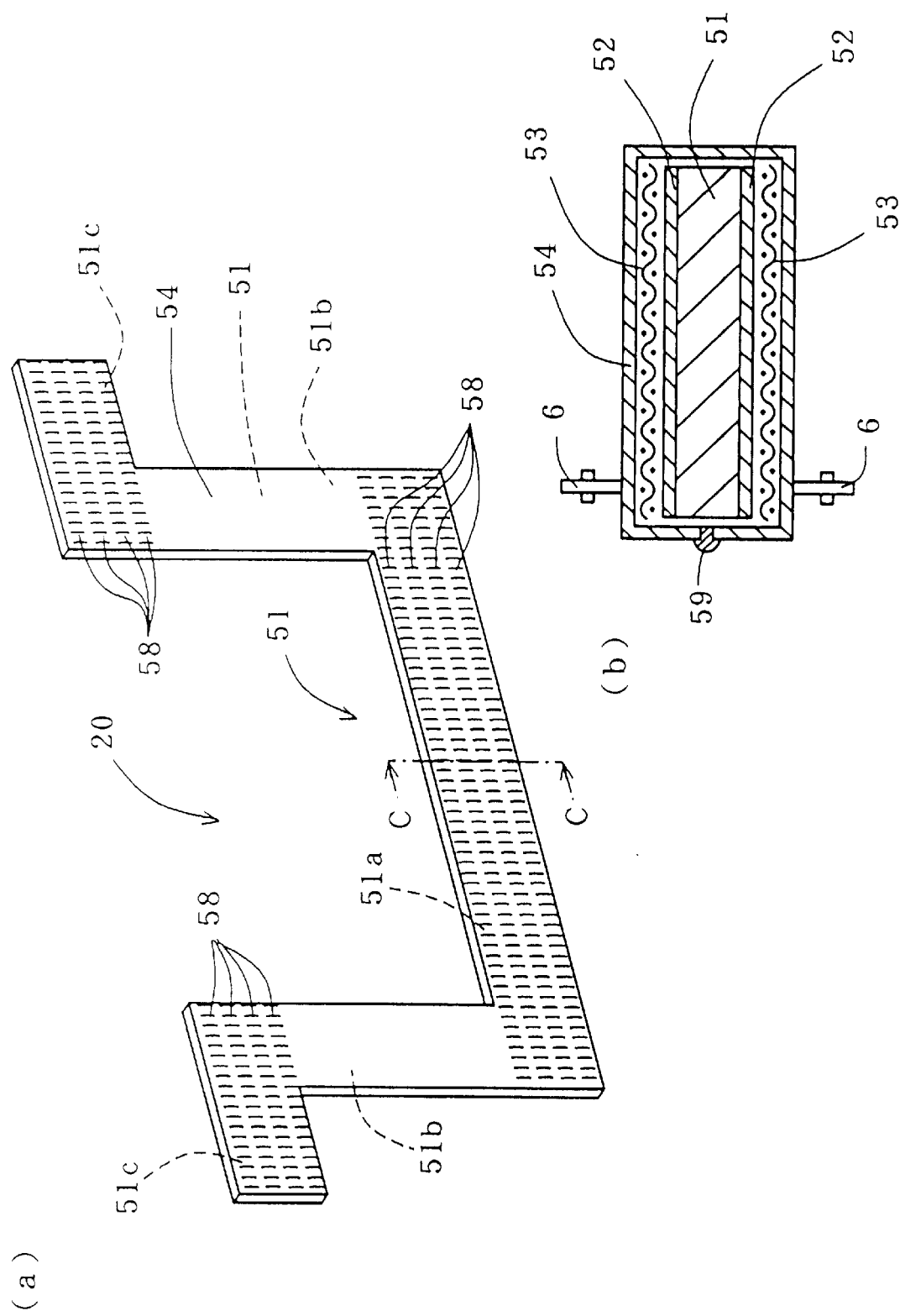
FIGS. 22a–22b are perspective views and the C—C sectional view thereof showing the cladding material using a Cu-based metal substrate.
Figures 22A, 22B:
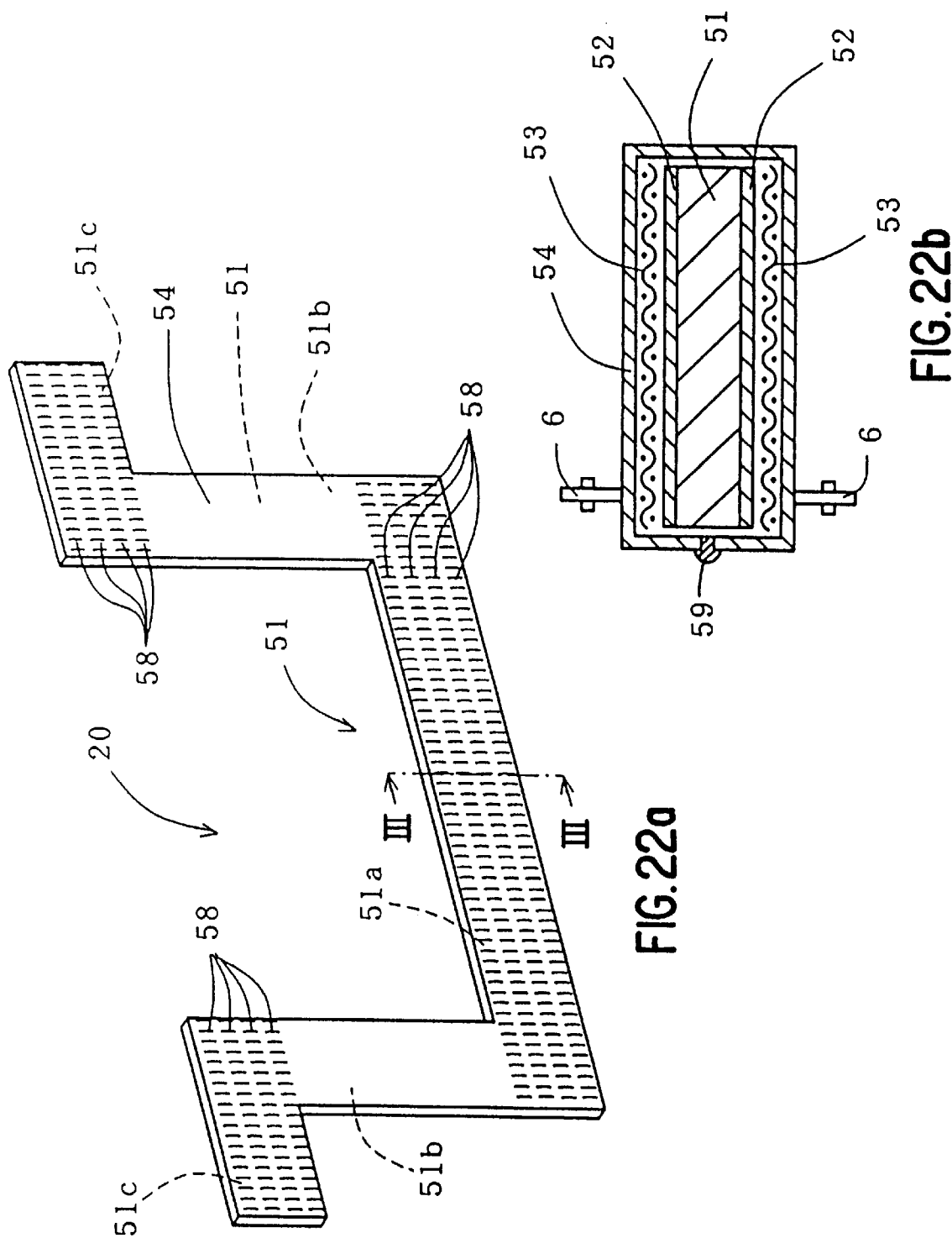

FIG. 22(b) presents the sectional view of the main body 51a of the cladding material 20. The soft solder layers 52 are formed on both sides of the metal substrate 51, the metal meshes 53 are placed thereon, and whole of the laminate is covered with the metal lining 54. Both ends of the metal lining 54 are bonded by the welded portion 59 at one edge side of the metal substrate 51 so as to wrapping it. By performing seam welding in this state, seam welded zones 58 are to be formed simultaneously on both sides of the metal substrate 51. The seam welded zone 58 is formed in a shape of plural lines arranged at a designated intervals, and each plural lines extends along the longitudinal direction of the main body 51a, and along the projecting direction of the projecting portion 51c. Such cladding material 20 is preferably used as an electrode for electroplating or various electrolytical treatment, or as a bus bar for current feeding. More specifically, the cladding material 20 in FIG. 22 is preferably used as a submerged bus bar wherein the projecting portions 51c are positioned out of the electrolysis and used as terminal portions for current feeding, and wherein the main body 51a is immersed under the electrolysis and used as a supporting part which supports objects to be plated or anode baskets for accommodating the plating material in a suspended state.

Figure 23A:
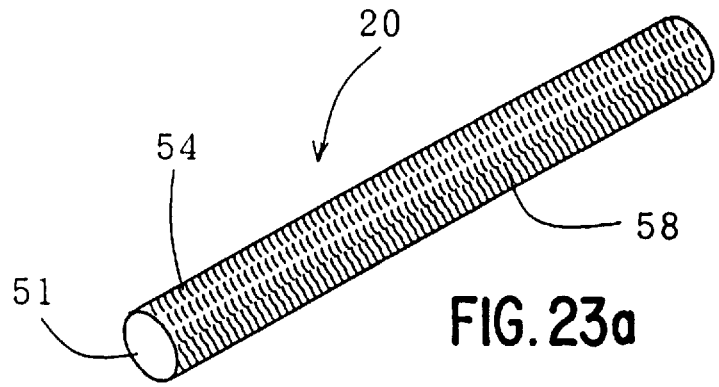
FIGS. 23a–23d are perspective views showing other appliance of the cladding material using a Cu-based metal substrate.
Figure 23B:
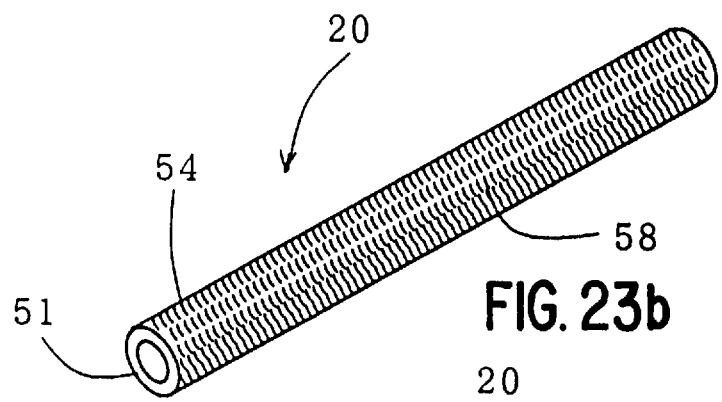
Figure 23C:
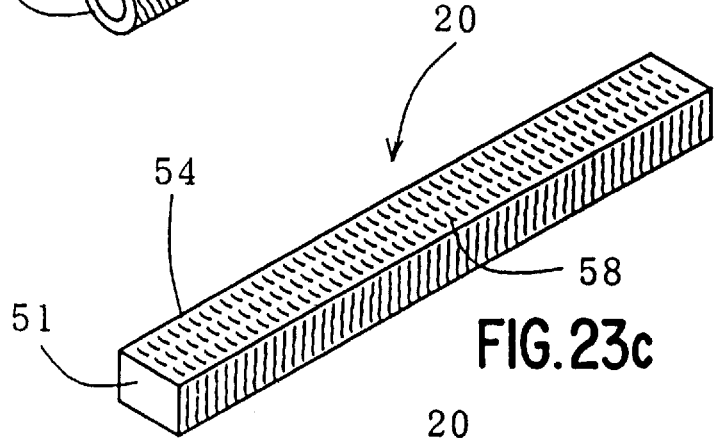
Figure 23D:
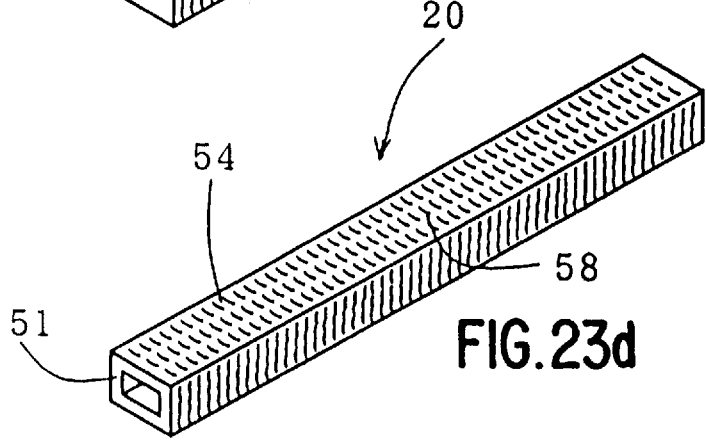

As is shown in FIG. 23(a)–(d), the metal substrate 51 can be formed in a rod or a bar with a circular or a square cross section. The metal lining 54 covers the outer surface of the substrate 51. The seam welded zones 58 are formed in a shape of plural linear lines extending along the longitudinal direction of the substrate 51 and arranged at a designated interval along the periphery thereof. In FIG. 23(b) and (d), the metal substrate 51 has a hollow structure. These embodiments are also preferably used for base bodies of electrodes or submerged bus bars (Experiment 1)

Plate-like metal substrates were prepared so as to have a dimension of 50 cm×50 cm×12 mm, and various kinds of metal foils (thickness: 10 to 100 $\mu$m), metal meshes (diameter of wire: 0.1 to 0.5 mm, mesh space: 16 to 100 mesh), and corrosion resistant metal plates (i.e., metal lining; thickness: 0.5 to 1.5 mm), each of which has the same area as the metal substrate, were laminated thereon. Then, a plurality of linear seam welded zones are formed along the longitudinal direction of the metal substrate with an interval of 25 mm according to the method shown in FIG. 1 for producing cladding materials (Table 1: sample No.1 to 20, Table 2: sample No.21 to 28). As reference samples, cladding materials comprising no metal mesh and metal foil are prepared. In these materials, the corrosion resistant metal plate is directly placed on the metal substrate, and seam welding is subsequently performed thereto (Table 3: sample No.31 to 38).

Materials used are described in the following.

Metal substrate: carbon steel (SS400), stainless steel (SUS304);

Corrosion resistant metal plate: Ti, Zr, Nb, Ta, Ni, Ti—Pd (palladium) alloy (Ti-0.15 wt % Pd), stainless steel (SUS316), Ni alloy (Hastelloy C-276, Ni-5 wt % Fe-16 wt % Cr-16 wt % Mo);

Metal mesh: stainless steel (SUS304), composite mesh (wherein lengthwise wires consists of stainless steel (SUS304), breadthwise wires consists of carbon steel (SS400, coated with Zn), diameter of the wires is 0.1–0.5 mm, and the mesh space is 16–100 mesh), composite mesh (wherein lengthwise wires consists of Ni, breadthwise wires consists of Cu, diameter of the wires is 0.1–0.5 mm, and the mesh space is 16–100 mesh), Cu—Sn—P alloy (JIS-C5111, Cu-3.5 to 4.5 wt % Sn-0.03 to 0.35 wt % P), and nickel (diameter of wire:0.1–0.5 mm, mesh space:16–100 mesh). Expanded metals of stainless steel (SUS304) are used for samples No.7, 18 to 20 in Table 1. For the preparation of expanded metals, stainless steel sheet with a thickness of 0.6 mm was used. The size of rhombic mesh opening thereof (FIG. 9) was 6.0 mm for the long diagonal line R and 3.2 mm for the short diagonal line S;

Metal foil: Ni, Cu, brass (Cu-30 wt % Zn), German silver (JIS-C7521, Zn-61.0 to 67.0 wt % Cu-16.5 to 19.5 wt % Ni), Ni brazing material (MBF-20: Ni-7.0 wt % Cr-3.0 wt % Fe-4.5 wt % Si-3.2 wt % B, products by Allaid Co.).

Condition of seam welding is controlled in the following range:

Electric current: 5000 to 25000 A;
Welding time: 5 to 50 cycle;
Intermission: 5 to 50 cycle;
Pressure: 500 to 1500 kg;
Width of electrode: 5 to 20 mm;
Speed of welding: 500 to 1500 mm/min.

Bend test was performed for each cladding material under a condition wherein the inner diameter of bending was twice of the cladding material's thickness, and bending angle was 180°. The bonding condition between the corrosion resistant metal plate and the metal substrate was judged whether the bonded part is peeled off or not. The results are presented in Tables 1–3.

The cladding materials of this invention (Table 1 and 2) showed good bonding conditions while the bonded parts of all comparative samples (Table 3) were peeled off.

(Experiment 2)

Intermediate metal layers (thickness: 10 to 100 $\mu$m), metal meshes and corrosion resistant metal plates (thickness: 0.5 to 1.5 mm) are laminated in this order on copper-based metal substrates with a dimension of 5 cm ×100 cm ×6 mm. Then, a plurality of linear seam welded zones extending along the longitudinal direction of the metal substrate are formed so as to be juxtaposed closely each other according to the method shown in FIG. 1 for producing cladding materials (Table 4: sample No.41–51). As reference samples, a cladding material comprising no metal mesh (Table 4: sample No.52), or that comprising no metal mesh and no intermediate metal layer (Table 4: sample No.53 to 56) were also prepared.

Materials used are described in the following:

Metal substrate: oxygen-free copper;

Corrosion resistant metal plate: Ti, Zr, Nb, Ta, stainless steel (SUS304) and Ni;

Metal mesh: composite mesh (wherein lengthwise wires consists of stainless steel (SUS304), breadthwise wires consists of Cu, diameter of the wires is 0.1–0.5 mm, and the mesh space is 16–100 mesh), composite mesh (wherein lengthwise wires consists of Ni, breadthwise wires consists of Cu, diameter of the wires is 0.1–0.5 mm, and the mesh space is 16–100 mesh);

Intermediate metal layer: soft solder (Sn-37 wt % Pb, Sn-47 wt % Pb-3 wt % Cu, and Sn-50 wt % Pb, each of which was fused and applied to the metal substrate).

Condition of seam welding is controlled in the following range:

Electric current: 5000 to 25000 A;
Welding time: 5 to 50 cycle;
Intermission: 5 to 50 cycle;
Pressure: 500 to 1500 kg;
Width of electrode: 5 to 20 mm;
Speed of welding: 500 to 1500 mm/min.

Bend test was performed for each cladding material under a condition wherein the inner diameter of bending was twice of the cladding material's thickness, and bending angle was 180°. The bonding condition between the corrosion resistant metal plate and the metal substrate was judged whether the bonded part is peeled off or not. The results are presented in Table 4.

The cladding materials of this invention showed good bonding conditions while the bonded parts of all comparative samples were peeled off.

(Experiment 3)

Plate-like metal substrates were prepared so as to have a dimension of 50 cm×50 cm×12 mm, and Fe-based metal mesh (diameter of wire: 0.1 to 0.5 mm, mesh space:16–100 mesh) and corrosion resistant metal plates (thickness: 0.1 to 1.5 mm), each of which has the same area as the metal substrate, were laminated thereon. Then, a plurality of linear seam welded zones are formed along the longitudinal direction of the metal substrate with an interval of 25 mm according to the method shown in FIG. 1 for producing cladding materials (Table 5: sample No.1–9). As reference samples, cladding materials comprising no metal mesh are prepared. In these materials, the corrosion resistant metal plate is directly placed on the metal substrate, and seam welding is subsequently performed thereto (Table 5: sample No.10 to 15).

Materials used are described in the following:

Metal substrate: carbon steel (SS400), stainless steel (SUS304, SUS316);
Corrosion resistant metal plate: Ti, Zr, Nb, Ta, Ti-Pd alloy (Ti-0.15 wt % Pd), stainless steel (SUS304);
Metal mesh: stainless steel (SUS304), carbon steel (SS400).

Condition of seam welding is controlled in the following range:

Electric current: 5000 to 25000 A;
Welding time: 5 to 50 cycle;
Intermission: 5 to 50 cycle;
Pressure: 500 to 1500 kg;
Width of electrode: 5 to 20 mm;
Speed of welding: 500 to 1500 mm/min.

Bend test was performed for each cladding material under a condition wherein the inner diameter of bending was twice of the cladding material's thickness, and bending angle was 180°. The bonding condition between the corrosion resistant metal plate and the metal substrate was judged whether the bonded part is peeled off or not. The results are presented in Table 5.

The cladding materials of this invention showed good bonding conditions while the bonded parts of all comparative samples were peeled off.

TABLE 1

| No. | Metal Substrate | Corrosion Resistant Metal Plate | Metal Net | Metal Layer | Peeling Off |
|---|---|---|---|---|---|
| 1 | SS400 | Ti | SUS304 | Ni foil | No |
| 2 | SS400 | Zr | SUS304 | Ni brazing material foil | No |
| 3 | SS400 | Nb | SUS304 | Ni foil | No |
| 4 | SUS304 | Ta | SUS304 | Ni foil | No |
| 5 | SUS304 | Ti-0.15 wt % Pd | SUS304 | Ni foil | No |
| 6 | SUS304 | Ni | SUS304 | Ni brazing material foil | No |
| 7 | SS400 | Ti | SUS304 Expanded metal | Ni foil | No |
| 8 | SS400 | SUS304 | Ni | Ni foil | No |
| 9 | SS400 | Zr | Cu alloy(JIS-C5111) | — | No |
| 10 | SUS304 | Ta | Ni | — | No |
| 11 | SS400 | Nb | Double layered net(SUS304 on the lining side, Ni on the metal substrate side) | — | No |
| 12 | SS400 | Ti | SUS304/Carbon steel composite | — | No |
| 13 | SS400 | Ti | SUS304/Carbon steel composite | Ni foil | No |
| 14 | SUS304 | Zr | SUS304/Carbon steel composite | Cu foil | No |
| 15 | SS400 | Nb | SUS304/Ni composite | — | No |
| 16 | SUS304 | Ni | SUS304/Ni composite | Cu foil | No |
| 17 | SUS304 | Ta | SUS304/Cu composite | — | No |
| 18 | SS400 | Ti | SUS304 Expanded metal | — | No |
| 19 | SS400 | Zr | SUS304 Expanded metal | — | No |
| 20 | SS400 | Ta | SUS304 Expanded metal | — | No |

TABLE 2

| No. | Metal Substrate | Corrosion Resistant Metal Plate | Metal Net | Metal Layer | Peeling Off |
|---|---|---|---|---|---|
| 21 | SS400 | Nb | — | Ni foil | No |
| 22 | SUS304 | Ta | — | Cu foil | No |
| 23 | SS400 | Zr | — | Brass foil (Cu-30 wt % Zn) | No |
| 24 | SS400 | Ta | — | German silver foil (Cu-13 wt % Ni-22 wt % Zn) | No |
| 25 | SS400 | Nb | — | Cu foil | No |
| 26 | SS400 | Ni | — | Ni brazing material foil | No |
| 27 | SS400 | HC-276(*1) | — | Ni foil | No |
| 28 | SS400 | SUS304 | — | Ni foil | No |

TABLE 3

| No. | Metal Substrate | Corrosion Resistant Metal Plate | Metal Net | Metal Layer | Peeling Off |
|---|---|---|---|---|---|
| 31 | SS400 | Ti | — | — | Yes |
| 32 | SUS304 | Ti | — | — | Yes |
| 33 | SS400 | Zr | — | — | Yes |
| 34 | SUS304 | Nb | — | — | Yes |
| 35 | SUS304 | Ta | — | — | Yes |
| 36 | SUS304 | Ni | — | — | Yes |
| 37 | SS400 | Ta | — | — | Yes |
| 38 | SS400 | HC-276 (*1) | — | — | Yes |

TABLE 4

| | No. | Metal Substrate | Corrosion Resistant Metal Plate | Metal Net | Metal Layer | Peeling Off |
|---|---|---|---|---|---|---|
| Practical Examples | 41 | Cu | Ti | SUS304/Cu composite | Sn-37 wt % Pb | No |
| | 42 | Cu | Ti | SUS304/Cu composite | Sn-47 wt % Pb-3 wt % Cu | No |
| | 43 | Cu | Ti | SUS304/Cu composite | Sn-50 wt % Pb | No |
| | 44 | Cu | Zr | SUS304/Cu composite | Sn-37 wt % Pb | No |
| | 45 | Cu | Nb | SUS304/Cu composite | Sn-37 wt % Pb | No |
| | 46 | Cu | Ta | SUS304/Cu composite | Sn-37 wt % Pb | No |
| | 47 | Cu | Ni | SUS304/Cu composite | Sn-37 wt % Pb | No |
| | 48 | Cu | SUS304 | Ni/Cu composite | Sn-37 wt % Pb | No |
| | 49 | Cu | Nb | Ni/Cu composite | Sn-37 wt % Pb | No |
| | 50 | Cu | Ta | Ni/Cu composite | Sn-37 wt % Pb | No |
| | 51 | Cu | HC-276 | Ni/Cu composite | Sn-37 wt % Pb | No |
| Comparative Examples | 52 | Cu | Ti | — | Sn-37 wt % Pb | Yes |
| | 53 | Cu | Zr | — | — | Yes |
| | 54 | Cu | Nb | — | — | Yes |
| | 55 | Cu | Ta | — | — | Yes |
| | 56 | Cu | Ni | — | — | Yes |

TABLE 5

| | No. | Metal Substrate | Corrosion Resistant Metal Plate | Metal Net | Peeling Off |
|---|---|---|---|---|---|
| Practical Examples | 1 | SS400 | Ti | SUS304 | No |
| | 2 | SUS304 | Ti | SS400 | No |
| | 3 | SS400 | Zr | SUS304 | No |
| | 4 | SUS304 | Nb | SS400 | No |
| | 5 | SUS304 | Ta | SS400 | No |
| | 6 | SS400 | Ti-015 wt % Pd | SUS304 | No |
| | 7 | SS400 | Ti | SUS304 | No |
| | 8 | SS400 | SUS304 | SUS304 | No |
| | 9 | SUS316 | Zr | SS400 | No |
| Comparative Examples | 10 | SS400 | Ti | — | Yes |
| | 11 | SUS304 | Ti | — | Yes |
| | 12 | SS400 | Zr | — | Yes |
| | 13 | SUS304 | Nb | — | Yes |
| | 14 | SUS304 | Ta | — | Yes |
| | 15 | SS400 | SUS304 | — | Yes |

That which claimed is:

1. A cladding material comprising:
   an Fe-based metal substrate consisting of Fe or an Fe-alloy;
   a Ni-based metal layer placed on said Fe-based metal substrate;
   a metal mesh placed on said Ni-based metal layer in opposition to said Fe-based metal substrate with said Ni-based metal layer inbetween;
   a corrosion resistant metal lining consisting of a metal whose main component is selected from the group consisting of Ti, Zr, Nb, Ta, Ni, and a stainless steel, and placed in contact with said metal mesh in opposition to said Ni-based metal layer with said metal mesh inbetween;
   seam welded zone, which is provided in a planer or a linear form by using roller electrodes, and which bonds said Fe-based metal substrate, said Ni-based metal layer, said metal mesh and said corrosion resistant metal lining together.

2. A cladding material according to claim 1, wherein said Ni-based metal layer comprises a Ni-based metal foil, and wherein said metal mesh is a metal selected from the group consisting of Fe, Ni and Cu.

3. A cladding material according to claim 1, wherein said mesh is formed by making openings by making staggered cuts in a thickness direction in a metal plate over the whole part thereof so that each cut passes through the thickness of said metal plate, and the openings are formed by expanding said metal plate in a direction intersecting the length of said cuts thereby opening each cut.

4. A cladding material consisting of:
   an Fe-based metal substrate consisting of Fe or an Fe-alloy;
   a metal mesh consisting of a metal containing Fe as a main component and placed on said Fe-based metal substrate;
   a corrosion resistant metal lining consisting of a metal whose main component is selected from the group consisting of Ti, Zr, Nb, Ta, Ni, and a stainless steel, and placed in contact with said metal mesh in opposition to said Fe-based metal substrate with said metal mesh inbetween;
   seam welded zone, which is provided in a planer or a linear form by using roller electrodes, and which bonds said Fe-based metal substrate, said metal mesh and said corrosion resistant metal lining together.

5. A cladding material according to claim 4, wherein said corrosion resistant metal lining consists of Ti or a Ti-alloy.

6. A cladding material according to claim 4, wherein said corrosion resistant metal lining consists of Zr or a Zr-alloy.

7. A cladding material consisting of:
   a Fe-based metal substrate consisting of Fe or an Fe-alloy;
   a metal mesh placed on said Fe-based metal substrate, wherein said metal mesh consists of a set of metal wires of Fe or an Fe-alloy, and of another set of metal wires whose main component is Ni or Cu;
   a corrosion resistant metal lining consisting of a metal whose main component is selected from the group consisting of Ti, Zr, Nb, Ta, Ni and a stainless steel, and placed in contact with said metal mesh in opposition to said Fe-based metal substrate with said metal mesh inbetween;

seam welded zone, which is provided in a planer or linear form by using roller electrodes, and which bonds said Fe-based metal substrate, said metal mesh and said corrosion resistant metal lining together.

8. A cladding material according to claim 7, wherein said metal mesh consists of a Cu-alloy containing at least one selected from the group consisting of Zn, Sn, Ni and P.

9. A cladding material comprising:
an Fe-based metal substrate consisting of Fe or an Fe-alloy;
a metal mesh which is placed on said Fe-based metal substrate and whole of which consists of a metal containing a main component selected from Fe, Ni and Cu, wherein said mesh is formed by making openings by making staggered cuts in a thickness direction in a metal plate over the whole part thereof so that each cut passes through the thickness of said metal plate, and the openings are formed by expanding said metal plate in a direction intersecting the length of said cuts thereby opening each cut;
a corrosion resistant metal lining consisting of a metal whose main component is selected from the group consisting of Ti, Zr, Nb, Ta, Ni, and a stainless steel, and placed in contact with said metal mesh in opposition to said Fe-based metal substrate with said metal mesh inbetween;
seam welded zone, which is provided in a planer or linear form by using roller electrodes, and which bonds said Fe-based metal substrate, said metal mesh and said corrosion resistant metal lining together.

10. A cladding material comprising:
a metal substrate selected from the group consisting of Fe, Fe-alloy, Cu and Cu alloy;
a metal mesh placed on said metal substrate, wherein said metal mesh is formed by weaving two sets of materially different metal wires;
a corrosion resistant metal lining placed in contact with said metal mesh in opposition to said Fe-based metal substrate with said metal mesh inbetween;
seam welded zone, which is provided in a planer or linear form by using roller electrodes, and which bonds said metal substrate, said metal mesh and said corrosion resistant metal lining together.

11. A cladding material comprising:
a metal substrate selected from the group consisting of Fe, Fe-alloy, Cu and Cu-alloy;
an intermediate layer on said metal substrate;
a metal mesh placed on said intermediate layer, wherein said metal mesh is formed by weaving two sets of materially different metal wires and wherein said intermediate layer is between said metal substrate and said metal mesh;
a corrosion resistant metal lining placed in contact with said metal mesh in opposition to said Fe-based metal substrate with said metal mesh inbetween; and
seam welded zone, which is provided in a planer or linear form by using roller electrodes, and which bonds said metal substrate, said intermediate layer, said metal mesh and said corrosion resistant metal lining together.

12. A cladding material according to claim 10, wherein said metal mesh comprises the first set of metal wires which extend along a designated direction and are arranged almost parallel to each other, and the second set of metal wires consisting of a material different from said first wires which extend along a direction intersecting with said designated direction and are arranged almost parallel to each other.

13. A cladding material according to claim 10, wherein said corrosion resistant metal lining consists of a metal whose main component is selected from the group consisting of Ti, Zr, Nb, Ta, Ni and a stainless steel.

14. A cladding material comprising:
an Fe-based metal substrate consisting of Fe or an Fe-alloy;
a metal mesh placed on said Fe-based metal substrate, wherein said metal mesh comprises the first metal wires which extend along a designated direction and are arranged almost parallel to each other, and the second metal wires which extend along a direction intersecting with said designated direction and are arranged almost parallel to each other, consisting of a material different from said first wires, and wherein at least one of said first metal wires and said second metal wires consist of a metal whose main component is selected from the group consisting of Fe, Ni and Cu;
a corrosion resistant metal lining placed in contact with said metal mesh in opposition to said Fe-based metal substrate with said metal mesh inbetween;
seam welded zone, which is provided in a planer or linear form by using roller electrodes, and which bonds said Fe-based metal substrate, said metal mesh and said corrosion resistant metal lining together.

15. A cladding material comprising:
a metal substrate consisting of Cu or Cu-alloy;
an intermediate metal layer placed on said metal mesh and consisting of a metal having a melting point lower than that of said Cu-based metal substrate;
a metal mesh placed on said Fe-based metal substrate in opposition to said Cu-based metal substrate with said intermediate metal layer inbetween, wherein said metal mesh comprises the first metal wires which extend along a designated direction and are arranged almost parallel to each other, and the second metal wires consisting of a material different from said first wires, which extend along a direction intersecting with said designated direction and are arranged almost parallel to each other, and wherein at least one of said first metal wires and said second metal wires consist of a metal whose main component is selected from the group consisting of Fe, Ni and Cu;
a corrosion resistant metal lining placed in contact with said metal mesh in opposition to said Fe-based metal substrate with said metal mesh inbetween;
seam welded zone, which is provided in a planer or linear form by using roller electrodes, and which bonds said Fe-based metal substrate, said intermediate metal layer, said metal mesh and said corrosion resistant metal lining together.

16. A cladding material according to claim 15, wherein said intermediate metal layer containing more than 50 wt % of at least one component which is selected from the group consisting of Pb, Sn and Zn.

17. A cladding material comprising:
an Fe-based metal substrate consisting of Fe or an Fe-alloy;
an intermediate metal layer placed on said Fe-based metal substrate and selected from the group consisting of Cu, Cu-alloy, Ni and Ni-alloy;
a corrosion resistant metal lining consisting of a metal whose main component is Ni or consisting of a stainless steel, and placed on said intermediate metal layer in opposition to said Fe-based metal substrate with said intermediate metal layer inbetween;

seam welded zone, which is provided in a planer or a linear form by using roller electrodes, and which bonds said Fe-based metal substrate, said intermediate metal layer and said corrosion resistant metal lining together.

18. A cladding material comprising:

an Fe-based metal substrate consisting of Fe or an Fe-alloy;

an intermediate metal layer placed on said Fe-based metal substrate and selected from the group consisting of Cu, Cu-alloy, Ni and Ni-alloy;

a corrosion resistant metal lining placed on said intermediate metal layer in opposition to said Fe-based metal substrate with said intermediate metal layer inbetween;

seam welded zone, which is provided in a planer or a linear form by using roller electrodes, and which bonds said Fe-based metal substrate, said intermediate metal layer and said corrosion resistant metal lining together, wherein said corrosion resistant metal lining consists of an alloy containing Ni as a main component, 13–35 wt % of Cr, 3–25 wt % of Fe and 3–35 wt % of Mo.

19. A cladding material comprising:

an Fe-based metal substrate consisting of Fe or an Fe-alloy;

an intermediate metal layer placed on said Fe-based metal substrate;

a corrosion resistant metal lining consisting of a metal whose main component is Ni or consisting of a stainless steel, and placed on said intermediate metal layer in opposition to said Fe-based metal substrate with said intermediate metal layer inbetween;

seam welded zone, which is provided in a planer or a linear form by using roller electrodes, and which bonds said Fe-based metal substrate, said intermediate metal layer and said corrosion resistant metal lining together;

wherein said intermediate metal layer consists of an alloy containing Ni as a main component, 5–16 wt % of Cr, 2–4 wt % of B, 3.5–5.5 wt % of Si and 2–5 wt % of Fe.

20. A cladding material according to claim 17, wherein said intermediate metal layer consists of a Cu alloy containing at least one selected from the group consisting of Zn, Sn, Ni and P.

* * * * *